United States Patent
Miyamoto et al.

(10) Patent No.: US 10,370,823 B2
(45) Date of Patent: Aug. 6, 2019

(54) WORK VEHICLE AND METHOD OF CONTROLLING WORK VEHICLE

(71) Applicant: KOMATSU LTD., Tokyo (JP)

(72) Inventors: Shunsuke Miyamoto, Atsugi (JP); Masao Yoshizawa, Hiratsuka (JP); Yasuo Fujiwara, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 439 days.

(21) Appl. No.: 15/026,675

(22) PCT Filed: Dec. 17, 2014

(86) PCT No.: PCT/JP2014/083432
§ 371 (c)(1),
(2) Date: Apr. 1, 2016

(87) PCT Pub. No.: WO2015/114980
PCT Pub. Date: Aug. 6, 2015

(65) Prior Publication Data
US 2016/0237651 A1  Aug. 18, 2016

(30) Foreign Application Priority Data

Jan. 31, 2014 (JP) .................................. 2014-016828

(51) Int. Cl.
B60K 6/445 (2007.10)
B60K 6/365 (2007.10)
(Continued)

(52) U.S. Cl.
CPC ............ *E02F 9/2079* (2013.01); *B60K 6/387* (2013.01); *B60K 6/445* (2013.01); *B60W 10/06* (2013.01);
(Continued)

(58) Field of Classification Search
None
See application file for complete search history.

(56) References Cited

U.S. PATENT DOCUMENTS

| 8,308,593 B2 * | 11/2012 | Kumazaki | .............. | B60K 6/365 |
| | | | | 475/5 |
| 2003/0176955 A1 * | 9/2003 | Minagawa | ............. | B60K 6/365 |
| | | | | 701/22 |

(Continued)

FOREIGN PATENT DOCUMENTS

| CN | 103429935 A | 12/2013 |
| EP | 2 974 931 A1 | 1/2016 |

(Continued)

OTHER PUBLICATIONS

Office Action for the corresponding European application No. 14 881 179.7, dated Aug. 7, 2018.

(Continued)

*Primary Examiner* — Charles A Fox
*Assistant Examiner* — Ryan P Dodd
(74) *Attorney, Agent, or Firm* — Global IP Counselors, LLP

(57) ABSTRACT

A power transmission device of a work vehicle includes a mode switching mechanism configured to switch a drive power transmission route to one mode of at least two modes. A second mode is used in a range with the higher transmission speed ratio than a first mode. A controller increases the rotation speed of the engine from a first rotation speed for the engine corresponding to a first vehicle speed when the vehicle speed is within a range greater than the first vehicle speed where the transmission speed ratio reaches a predetermined first value that is less than the maximum value of the transmission speed ratio obtainable by the power transmission device. When the transmission route is in the second mode, the first value is greater than a second value of the (Continued)

transmission speed ratio at which the rotation speeds of the first motor and the second motor are equal.

11 Claims, 14 Drawing Sheets

(51) Int. Cl.
| | |
|---|---|
| E02F 9/20 | (2006.01) |
| B60W 10/06 | (2006.01) |
| B60W 10/08 | (2006.01) |
| B60W 10/10 | (2012.01) |
| F16H 59/18 | (2006.01) |
| F16H 3/44 | (2006.01) |
| F16H 3/72 | (2006.01) |
| B60K 6/387 | (2007.10) |
| B60W 30/182 | (2012.01) |
| B60W 20/30 | (2016.01) |
| B60W 20/00 | (2016.01) |
| E02F 9/22 | (2006.01) |
| F16H 37/10 | (2006.01) |
| E02F 3/28 | (2006.01) |
| B60K 6/38 | (2007.10) |
| F16H 61/66 | (2006.01) |

(52) U.S. Cl.
CPC ............ *B60W 10/08* (2013.01); *B60W 10/10* (2013.01); *B60W 20/30* (2013.01); *B60W 30/182* (2013.01); *E02F 9/202* (2013.01); *E02F 9/2004* (2013.01); *E02F 9/2075* (2013.01); *F16H 3/44* (2013.01); *F16H 3/728* (2013.01); *F16H 59/18* (2013.01); *B60K 6/365* (2013.01); *B60K 2006/381* (2013.01); *B60W 20/00* (2013.01); *B60W 2300/17* (2013.01); *B60W 2510/0638* (2013.01); *B60W 2520/10* (2013.01); *B60W 2710/0644* (2013.01); *B60Y 2200/415* (2013.01); *B60Y 2300/70* (2013.01); *B60Y 2400/73* (2013.01); *E02F 3/283* (2013.01); *E02F 9/2066* (2013.01); *E02F 9/2292* (2013.01); *E02F 9/2296* (2013.01); *F16H 2037/101* (2013.01); *F16H 2061/6601* (2013.01); *F16H 2061/6602* (2013.01); *F16H 2200/2007* (2013.01); *F16H 2200/2041* (2013.01); *Y02T 10/6239* (2013.01); *Y10S 903/903* (2013.01)

(56) References Cited

U.S. PATENT DOCUMENTS

| | | | |
|---|---|---|---|
| 2007/0225097 A1 | 9/2007 | Raghavan et al. | |
| 2008/0109139 A1 | 5/2008 | Muta et al. | |
| 2009/0105028 A1 | 4/2009 | Hiraki et al. | |
| 2010/0029428 A1* | 2/2010 | Abe | B60K 6/365 |
| | | | 475/5 |
| 2010/0137098 A1 | 6/2010 | Egami | |
| 2011/0312461 A1 | 12/2011 | Park | |
| 2012/0072065 A1* | 3/2012 | Minamikawa | B60K 6/445 |
| | | | 701/22 |
| 2012/0149515 A1 | 6/2012 | Holmes et al. | |
| 2014/0169923 A1 | 6/2014 | Shirao | |
| 2015/0192192 A1* | 7/2015 | Honda | F16H 3/727 |
| | | | 475/10 |
| 2015/0298685 A1* | 10/2015 | Ono | B60K 6/445 |
| | | | 701/22 |
| 2015/0322872 A1* | 11/2015 | Matsubara | B60K 6/445 |
| | | | 701/22 |
| 2016/0083931 A1 | 3/2016 | Monden et al. | |

FOREIGN PATENT DOCUMENTS

| | | |
|---|---|---|
| JP | 2006-329244 A | 12/2006 |
| JP | 2007-69632 A | 3/2007 |
| JP | 2008-120132 A | 5/2008 |
| JP | 2009-280176 A | 12/2009 |
| JP | 2010-70008 A | 4/2010 |
| JP | 2010-132020 A | 6/2010 |
| JP | 2011-183990 A | 9/2011 |
| JP | 2012-106636 A | 6/2012 |

OTHER PUBLICATIONS

The International Search Report for the corresponding international application No. PCT/JP2014/083432, dated Mar. 24, 2015.
The extended European search report for the corresponding European application No. 14881179.7, dated Apr. 6, 2017.
The Office Action for the corresponding Chinese application No. 201480055339.X, dated Nov. 17, 2016.

* cited by examiner

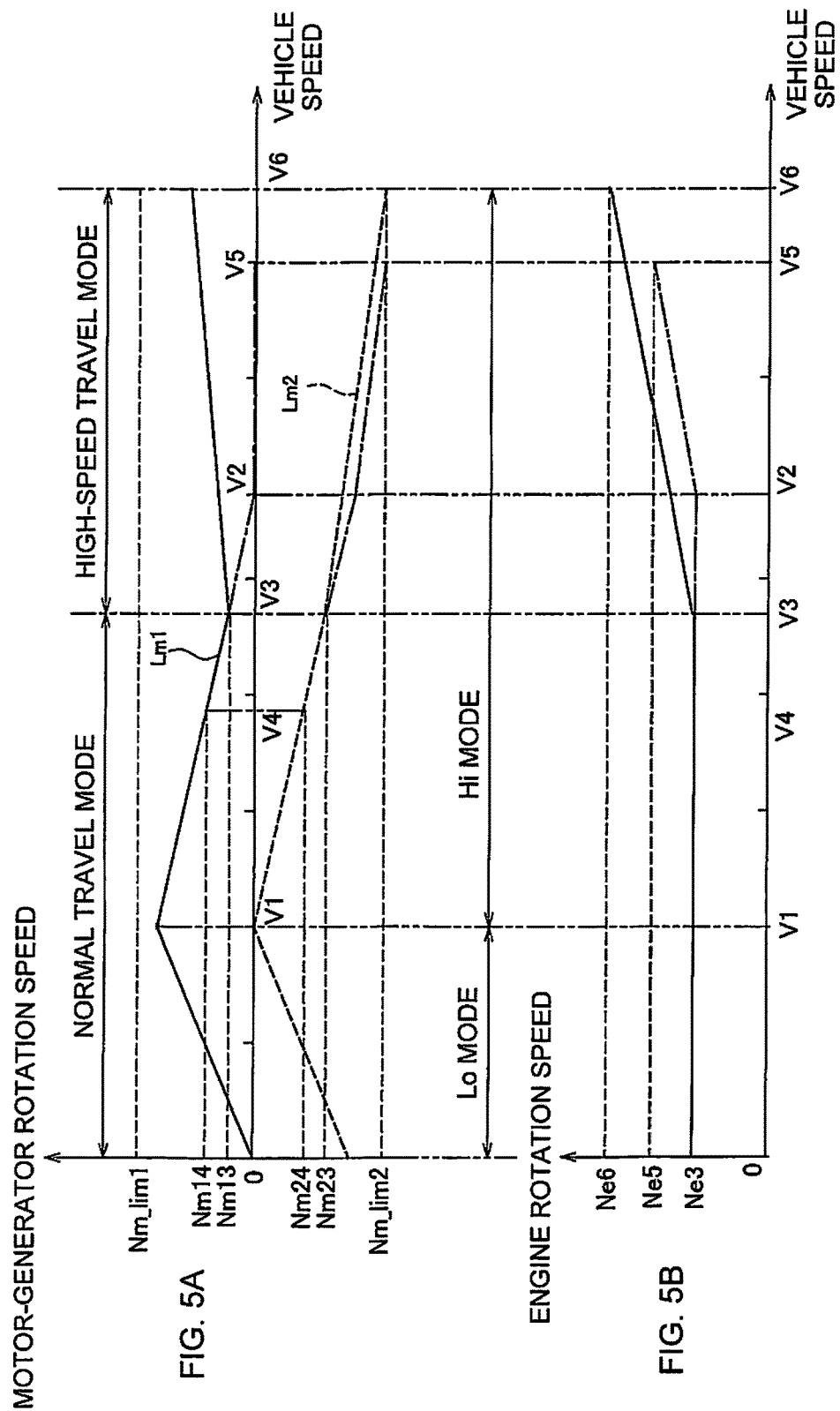

WORK VEHICLE AND METHOD OF CONTROLLING WORK VEHICLE

CROSS-REFERENCE TO RELATED APPLICATIONS

This application is a U.S. National stage application of International Application No. PCT/JP2014/083432, filed on Dec. 17, 2014. This U.S. National stage application claims priority under 35 U.S.C. § 119(a) to Japanese Patent Application No. 2014-016828, filed in Japan on Jan. 31, 2014, the entire contents of which are hereby incorporated herein by reference.

BACKGROUND

Field of the Invention

The present invention relates generally to a work vehicle; more specifically the present invention relates to a hybrid work vehicle and a method of controlling the same.

Background Information

Hybrid work vehicles have been proposed in recent years that travel using the drive power from the engine and the drive power from a motor. For instance, Japanese laid-open Patent Application Publication No. 2006-329244 discloses a hybrid work vehicle wherein a hydraulic mechanical transmission (HMT) or an electro-mechanical transmission (EMT) serves as the power transmission device.

The HMT includes a planetary gear mechanism, and a first pump-motor and a second pump-motor connected to the rotational elements in the planetary gear mechanism. The first pump-motor and the second pump-motor function as either a hydraulic motor or a hydraulic pump depending on the travel state of the work vehicle. The HMT continuously varies the rotation speed of the output shafts to thereby change the rotation speed of the pump-motors.

The EMT uses an electric motor in place of the hydraulic motor in the HMT. That is, the EMT includes a first generator-motor and a second generator-motor. The first generator-motor and the second generator-motor function as either an electric motor or an electric generator depending on the travel state of the work vehicle. Similarly to the HMT, the EMT continuously varies the rotation speed of the output shafts to thereby change the rotation speed of the generator-motors.

There is less internal loss in the above-described kinds of hybrid power transmission devices compared to mainstream power transmission devices that include a torque converter and a multi-speed transmission (hereafter referred to as "torque converter transmission"). Consequently, the advantage of a hybrid power transmission is its superior efficiency at transmitting the drive power from the engine to the travel apparatus to obtain traction, and thus its fuel efficiency.

Japanese laid-open Patent Application Publication No. 2006-329244 discloses an example of providing two motors, i.e. a first motor and a second motor in the power transmission device to thereby achieve continuously variable shifting. The invention disclosed in Japanese laid-open Patent Application Publication No. 2006-329244 further includes a mechanism for selectively switching the power transmission mechanism in accordance with the vehicle speed. Switching over to a mechanism that is selectable when the vehicle speed is high is referred to as the Hi mode, while switching over to a mechanism that is selectable when the vehicle speed is low is referred to as Lo mode. FIG. 14 illustrates the relationship between the vehicle speed and the speed of the first motor and the second motor in the invention described in Japanese laid-open Patent Application Publication No. 2006-329244. The speeds of the first motor and the second motor are represented in FIG. 14 by Lm1 and Lm2, respectively. In FIG. 14, the rotation direction of the first motor when the work vehicle 1 travels forward is assumed to be the forward direction; a positive motor speed ratio represents the first motor or the second motor rotating in the forward direction, and a negative motor speed ratio represents the first motor or the second motor rotating in the reverse direction. In the aforementioned work vehicle, the mode in the power transmission device switches at a vehicle speed V1. At and beyond the vehicle speed V1, the power transmission mechanism does not change in Hi mode. Here, the speed of the first motor is zero when the vehicle speed is V2 (e.g., refer to FIG. 2(*a*) in Japanese laid-open Patent Application Publication No. 2006-329244).

SUMMARY

In the invention described in Japanese laid-open Patent Application Publication No. 2006-329244, when the work vehicle attempts to output a speed greater than V2, there is no choice but to increase the engine rotation speed while the rotation speed of the first motor is zero. The rotation speed of the second motor further decreases as a result. The rotation speed of the second motor reaches its limit value Nm_lim2 at a vehicle speed V5. Thus the work vehicle disclosed in Japanese laid-open Patent Application Publication No. 2006-329244 cannot increase its speed beyond the vehicle speed V5.

The present invention proposes a hybrid work vehicle capable of increasing the limiting vehicle speed.

A work vehicle according to a first exemplary embodiment of the invention is provided with an engine, a hydraulic pump, a work implement, a travel apparatus, a power transmission device, and a controller. The hydraulic pump is driven by the engine. The work implement driven by hydraulic fluid discharged from the hydraulic pump. The travel apparatus is driven by the engine. The power transmission device transmits the drive power from the engine to the travel apparatus. The controller controls the power transmission device. The power transmission device includes an input shaft, an output shaft, a gear mechanism, a first motor, a second motor and a mode switching mechanism. The gear mechanism includes a planetary gear mechanism, and is configured to transmit the rotations of the input shaft to the output shaft. The first motor and the second motor are connected to a rotation element in the planetary gear mechanism. A mode switching mechanism is configured to switch a drive power transmission route in the power transmission device to one mode of at least two modes. The power transmission device is configured such that varying the rotation speeds of the motors varies the transmission speed ratio, which is a ratio of the rotation speed of the output shaft to the rotation speed of input shaft. The at least two modes include a first mode, and a second mode used in a range with the higher transmission speed ratio than the first mode.

The controller increases the rotation speed of the engine from a first rotation speed for the engine corresponding to a first vehicle speed when the vehicle speed is within a range of vehicle speeds that are greater than the first vehicle speed where the transmission speed ratio reaches a predetermined first value that is less than the maximum value of the transmission speed ratio obtainable by the power transmission device. When the transmission route is in the second mode, the first value is greater than a second value of the transmission speed ratio at which the rotation speed in the first motor and the rotation speed in the second motor are equal.

The range of transmission speed ratios that can be used during the second mode may be the range with the highest of the transmission speed ratios that can be used during the at least two modes.

The rotation speed ratio of the motors to the input shaft during the first mode, and the rotation speed ratio of the motors to the input shaft during the second mode may be equal when the transmission speed ratio is at a predetermined mode switching threshold. The second value may be greater than the mode switching threshold and less than the maximum value of the transmission speed ratio.

The controller increases the rotation speed of the engine linearly in relation to the vehicle speed (i.e., a linear function) from the first rotation speed for the engine corresponding to the first vehicle speed when the vehicle speed belongs to a range of speeds greater than the first vehicle speed.

The controller may further include a motor control unit configured to control the first motor and the second motor so that the transmission speed ratio is kept at the first value while the rotation speed of the engine is increasing. More specifically, the motor control unit may control the rotation speed of at least one of the first motor and the second motor so that the rotation speed thereof is a value proportional to the rotation speed of the engine.

The work vehicle may be further provided with an accelerator operating member configured to be operated by an operator. The controller may further include a motor control unit. When the vehicle speed belongs to a range of speeds larger than the first vehicle speed, the motor control unit increases the torque output from the engine to the extent an operation amount of the accelerator operating member increases, and decreases the torque output from the engine to the extent the operation amount of the accelerator operating member decreases.

The motor control unit may release the hold on the transmission speed ratio when the rotation speed of the engine reaches or falls below a predetermined second rotation speed while the transmission speed ratio is being kept at a first value.

The work vehicle may be further provided with a work implement operating member with which an operator operates the work implement. The motor control unit may release the hold on the transmission speed ratio when the work implement operating member is operated.

A work vehicle according to a second exemplary embodiment of the invention is provided with an engine, a hydraulic pump, a work implement, a travel apparatus, a power transmission device, and a controller. The hydraulic pump is driven by the engine. The work implement driven by hydraulic fluid discharged from the hydraulic pump. The travel apparatus is driven by the engine. The power transmission device transmits the drive power from the engine to the travel apparatus. The controller controls the power transmission device. The power transmission device includes an input shaft, an output shaft, a gear mechanism, a first motor, a second motor and a mode switching mechanism. The gear mechanism includes a planetary gear mechanism, and is configured to transmit the rotations of the input shaft to the output shaft. The first motor and the second motor are connected to a rotation element in the planetary gear mechanism. A mode switching mechanism is configured to switch a drive power transmission route in the power transmission device to one mode of at least two modes. The power transmission device is configured such that varying the rotation speed of the motors varies the transmission speed ratio, which is the rotation speed of the output shaft in relation to the rotation speed of input shaft.

The controller includes a motor control unit. The motor control unit is configured to control the first motor and the second motor so that the transmission speed ratio is kept at a maximum value when the vehicle speed belongs to a range of speeds greater than a second vehicle speed and less than a third vehicle speed. The transmission speed ratio reaches the maximum value in the power transmission device at the second vehicle speed. The rotation speed of the second motor reaches a predetermined limit value at the third vehicle speed. The third vehicle speed is greater than the second vehicle speed. The motor control unit controls the first motor and the second motor so that the transmission speed ratio decreases when the vehicle speed is within a range of vehicle speeds that are greater than the third vehicle speed. The controller increases the rotation speed of the engine from a second rotation speed for the engine corresponding to the second vehicle speed when the vehicle speed belongs to a range of speeds greater than the second vehicle speed and less than the third vehicle speed. The controller increases the rotation speed of the engine from a third rotation speed for the engine corresponding to the third vehicle speed when the vehicle speed is within a range of vehicle speeds that are greater than the third vehicle speed.

The at least two modes may include a first mode, and a second mode used in a range with a higher transmission speed ratio than the first mode. When the transmission route is in the second mode, the maximum value of the transmission speed ratio may be greater than a second value of the transmission speed ratio at which the rotation speed in the first motor and the rotation speed in the second motor are equal.

The controller increases the rotation speed of the engine linearly in relation to the vehicle speed (i.e., a linear function) from the second rotation speed for the engine when the vehicle speed is within a range of vehicle speeds that are greater than the second vehicle speed and less than the third vehicle speed, and increases the rotation speed of the engine from the third rotation speed for the engine when the vehicle speed belongs to a range of speeds greater than the third vehicle speed.

A first ratio of an increment in the rotation speed of the engine to an increment in the vehicle speed when the vehicle speed is within a range of vehicle speeds that are greater than the second vehicle speed and less than the third vehicle speed is less than a second ratio of an increment in the rotation speed of the engine to an increment in the vehicle speed when the vehicle speed is within a range of vehicle speeds that are greater than the third vehicle speed.

The first motor and the second motor may be electric motors.

A method of control according to a third exemplary embodiment of the invention is a method of controlling a work vehicle provided with a power transmission device. The power transmission device includes an input shaft, an output shaft, a gear mechanism, a first motor, a second motor and a mode switching mechanism. The gear mechanism includes a planetary gear mechanism, and is configured to transmit the rotations of the input shaft to the output shaft. The first motor and the second motor are connected to a rotation element in the planetary gear mechanism. The mode switching mechanism is configured to switch a drive power transmission route in the power transmission device to one mode of at least two modes. The power transmission device is configured such that varying the rotation speed of the motors varies the transmission speed ratio, which is the rotation speed of the output shaft in relation to the rotation speed of input shaft. The at least two modes includes a first mode, and a second mode used in a range with the higher transmission speed ratio than the first mode.

This method of control includes a step of increasing the rotation speed of the engine from a first rotation speed for the engine corresponding to a first vehicle speed when the vehicle speed increase more than the first vehicle speed where the transmission speed ratio reaches a predetermined first value that is less than the maximum value of the transmission speed ratio obtainable by the power transmission device. When the transmission route is in the second mode, the first value is greater than a second value of the transmission speed ratio at which the rotation speed in the first motor and the rotation speed in the second motor are equal.

According to the first and the third exemplary embodiments of the present invention, the controller increases the rotation speed of the engine when transmission speed ratio reaches the predetermined first value less than the maximum value obtainable by the power transmission device. As a result, the vehicle speed at which the rotation speed of the second motor reaches a limit value is greater than the vehicle speed at which the rotation speed of the second motor reaches the limit value when the rotation speed of the engine is increased after the transmission speed ratio reaches the maximum value. Additionally, according to the second exemplary embodiment, the motor control unit reduces the transmission speed ratio so that the rotation speed of the second motor does not exceed the limit value therefor when the vehicle speed belongs to a range of speeds greater than the third vehicle speed whereat the rotation speed of the second motor reaches a predetermined limit value. The controller also increases the rotation speed of the engine from the third rotation speed for the engine corresponding to the third vehicle speed when the vehicle speed is within a range of vehicle speeds that are greater than the third vehicle speed. Thus, the work vehicle according to any one of the first through third exemplary embodiments is capable of traveling at a vehicle speed that is higher than a vehicle speed corresponding to a limiting motor rotation speed.

BRIEF DESCRIPTION OF DRAWINGS

FIGS. 5A and 5B illustrate change in the rotation speeds of the first motor and the second motor in relation to the vehicle speed, as well as the change in the rotation speed of an engine in relation to the vehicle speed.

DETAILED DESCRIPTION OF EXEMPLARY EMBODIMENTS

First Exemplary Embodiment

Figure 1:
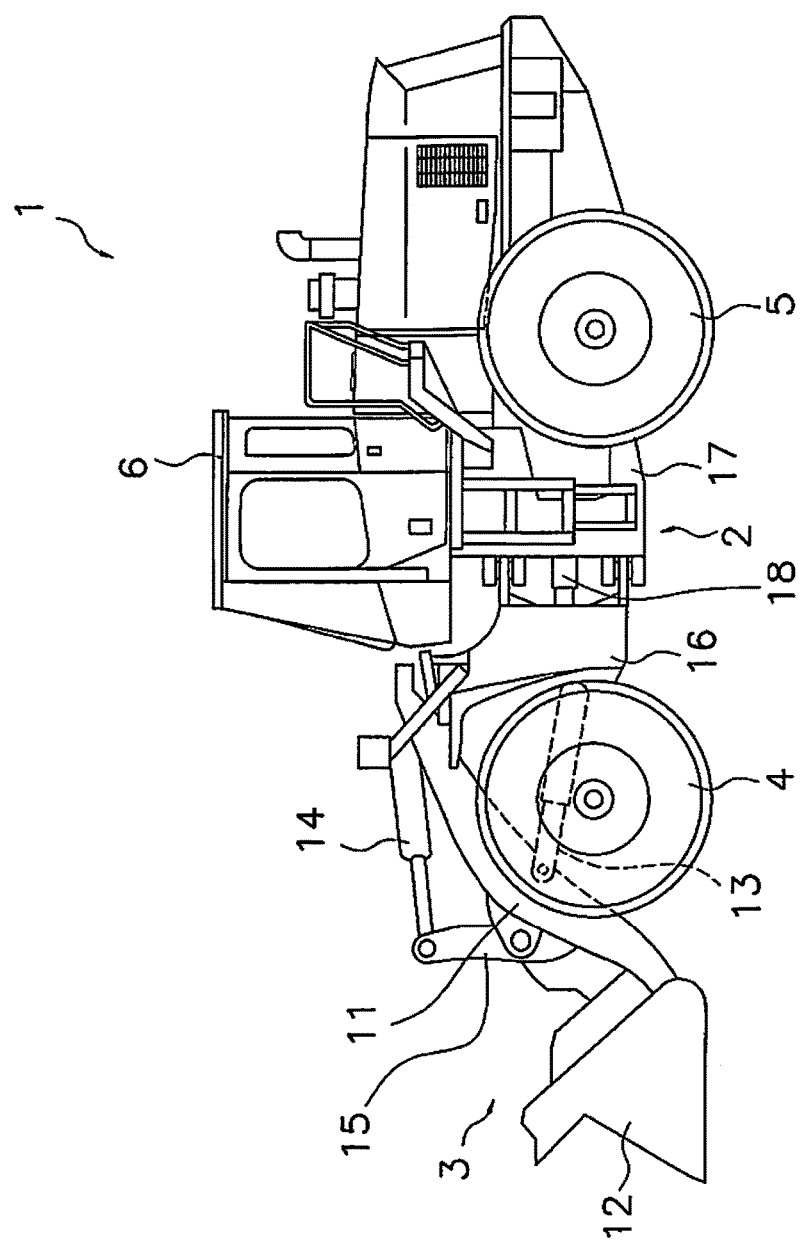
FIG. 1 is a side view illustrating a work vehicle according to the exemplary embodiments.

Exemplary embodiments of the present invention are described below with reference to the drawings. FIG. 1 is a side view illustrating a work vehicle 1 according to the exemplary embodiments. As illustrated in FIG. 1, the work vehicle 1 is provided with a vehicle frame 2, a work implement 3, traveling wheels 4, 5, and a cab 6. The work vehicle 1 is a wheel loader, and travels by rotationally driving the traveling wheels 4, 5. The work vehicle 1 uses the work implement 3 to perform work, such as excavation or the like.

The vehicle frame 2 includes a front frame 16 and a rear frame 17. The front frame 16 and the rear frame 17 are attached to be able to turn relative to each other in the left-right direction. The work implement 3 and the traveling wheels 4 are attached to the front frame 16. The work implement 3 is driven by hydraulic fluid from a later-described work implement pump 23 (refer to FIG. 2). The work implement 3 includes a boom 11 and a bucket 12. The boom 11 is mounted to the vehicle frame 2. The work implement 3 includes a lift cylinder 13, and a bucket cylinder 14. The lift cylinder 13 and the bucket cylinder 14 are hydraulic cylinders. One end of the lift cylinder 13 is attached to the front frame 16. The other end of the lift cylinder 13 is attached to the boom 11. Hydraulic fluid from the work implement pump 23 extends and retracts the lift cylinder 13 to thereby rotate the boom 11 vertically. A bucket 12 is attached at the front end of the boom 11. One end of the bucket cylinder 14 is attached to the vehicle frame 2. The other end of the bucket cylinder 14 is attached to the bucket 12 via a bell crank 15. Hydraulic fluid from the work implement pump 23 extends and retracts the bucket cylinder 14 to thereby rotate the bucket 12 vertically.

The cab 6 and the traveling wheels 5 are attached to the rear frame 17. The cab 6 is mounted on the vehicle frame 2. Arranged within the cab 6 are a seat whereon an operator may sit, an operating device (later described), and the like.

The work vehicle 1 includes a steering cylinder 18. The steering cylinder 18 is attached to the front frame 16 and the rear frame 17. The steering cylinder 18 is a hydraulic cylinder. Hydraulic fluid from a later-described steering pump 30 extends and retracts the steering cylinder 18 to thereby change the travel direction of the work vehicle 1 to the left or the right.

Figure 2:
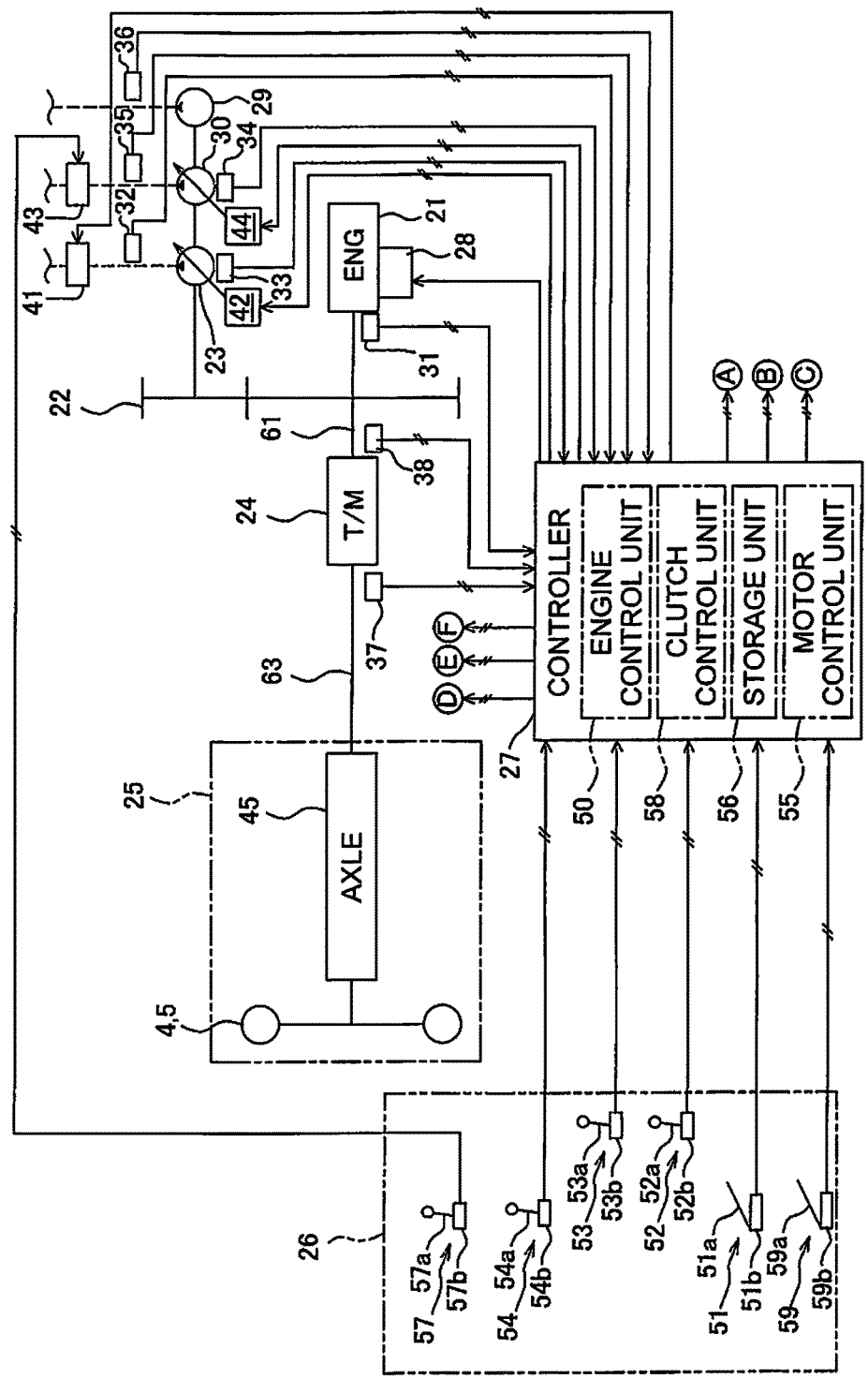
FIG. 2 is a schematic view illustrating a configuration of the work vehicle.

FIG. 2 is a schematic view illustrating a configuration of the work vehicle 1. As illustrated in FIG. 2, the work vehicle 1 is equipped with an engine 21, a power take-off (PTO) 22, a power transmission device 24, a travel apparatus 25, an operating device 26, a controller 27, and the like.

The engine 21 may be a diesel engine. Output of the engine 21 is controlled by adjusting the amount of fuel injected into a cylinder in the engine 21. The amount of fuel is adjusted via the controller 27 controlling a fuel injector 28 installed in the engine 21. The work vehicle 1 is provided with an engine-speed detector 31. The engine-speed detector 31 detects the rotation speed of the engine and sends the controller 27 a detection signal indicative of the engine rotation speed.

The work vehicle 1 includes the work implement pump 23, the steering pump 30, and a transmission pump 29. The work implement pump 23, the steering pump 30, and the transmission pump 29 are hydraulic pumps. The PTO 22 transmits a portion of the drive power from the engine 21 to the hydraulic pumps 23, 29, 30. In other words, the PTO 22 distributes the drive power from the engine 21 to the hydraulic pumps 23, 29, 30, and to the power transmission device 24.

The work implement pump 23 is driven by drive power from the engine 21. The hydraulic fluid discharged from the work implement pump 23 is supplied to the above-described lift cylinder 13 and the bucket cylinder 14 via a work implement control valve 41. The work vehicle 1 is equipped with a work-implement-pump pressure detector 32. The work-implement-pump pressure detector 32 detects the discharge pressure of the hydraulic fluid expelled from the work implement pump 23 (referred to as "work implement pump pressure" below), and sends the controller 27 a detection signal indicative of the work implement pump pressure.

The work implement pump 23 is a variable displacement hydraulic pump. Changing the tilt angle of the swashplate or the tilt axis in the work implement pump 23 changes the discharge displacement of the work implement pump 23. Note that the discharge displacement signifies the amount of hydraulic fluid discharged from hydraulic pump per pump rotation. The work implement pump 23 is connected to a first displacement control device 42. The first displacement control device 42 changes the tilt angle in the work implement pump 23 under the control of the controller 27. The controller 27 may thereby control the discharge displacement of the work implement pump 23. For instance, the first displacement control device 42 may adjust the tilt angle in the work implement pump 23 to create a fixed pressure differential in front of and behind the work implement control valve 41. The first displacement control device 42 may also change the tilt angle in the work implement pump 23 as desired in accordance with a command signal from the controller 27. More specifically, the first displacement control device 42 includes a first and a second valve (not shown). When the above-described work implement control valve 41 changes the amount of hydraulic fluid being supplied to the work implement 3, depending on the change in the position of the work implement control valve 41, a pressure differential is generated between the discharge pressure from the work implement pump 23 and the pressure of the hydraulic fluid after passing through the work implement control valve 41. The first valve, under control of the controller 27 adjust the tilt angle in the work implement pump 23 so that the pressure differential in front of and behind the work implement control valve 41 remains constant even when the load on the work implement 3 fluctuates. Additionally, the second valve under control of the controller 27 may further change the tilt angle in the work implement pump 23. The work implement 1 is equipped with a first tilt-angle detector 33. The first tilt-angle detector 33 detects the tilt angle in the work implement pump 23 and sends the controller 27 a detection signal representing the tilt angle.

The steering pump 30 is driven by drive power from the engine 21. The hydraulic fluid discharged from the steering pump 30 is supplied to the steering cylinder 18 via a steering control valve 43. The work vehicle 1 is equipped with a steering pump pressure detector 35. The steering pump pressure detector 35 detects the pressure of the hydraulic fluid discharged from the steering pump 30 (termed "steering pump pressure" below), and sends the controller 27 a detection signal indicative of the steering pump pressure.

The steering pump 30 is a variable displacement hydraulic pump. Changing the tilt angle of the swashplate or the tilt axis in the steering pump 30 changes the discharge displacement of the steering pump 30. The steering pump 30 is connected to a second displacement control device 44. The second displacement control device 44 changes the tilt angle in the steering pump 30 under the control of the controller 27. The controller 27 may thereby control the discharge displacement of the steering pump 30. The work implement 1 is equipped with a second tilt-angle detector 34. The second tilt-angle detector 34 detects the tilt angle in the steering pump 30 and sends the controller 27 a detection signal representing the tilt angle.

The transmission pump 29 is driven by the drive power from the engine 21. The transmission pump 29 is a fixed displacement hydraulic pump. The hydraulic fluid discharged from the transmission pump 29 is supplied to clutches CF, CR, CL, CH in the power transmission device 24 via later-described clutch control valves VF, VR, VL, VH. The work vehicle 1 may be provided with a transmission pump pressure detector 36. The transmission pump pressure detector 36 detects the pressure of the hydraulic fluid discharged from the transmission pump 29 (termed "transmission pump pressure" below), and sends the controller 27 a detection signal indicative of the transmission pump pressure.

The PTO 22 transmits a portion of the drive power from the engine 21 to the power transmission device 24. The power transmission device 24 transmits the drive power from the engine 21 to the travel apparatus 25. The power transmission device 24 converts and outputs the drive power from the engine 21. The details on the configuration of the power transmission device 24 are described later.

The travel apparatus 25 includes an axle 45 and traveling wheels 4, 5. The axle 45 transmits the drive power from the power transmission device 24 to the traveling wheels 4, 5. Hereby, the traveling wheels 4, 5 rotate. The work vehicle 1 is provided with an output rotation speed detector 37 and an input rotation speed detector 38. The output rotation speed detector 37 detects the rotation speed of the output shaft 63 in the power transmission device 24 (referred to as "output rotation speed" below). Given that the output rotation speed corresponds to the vehicle speed, the output rotation speed detector 37 detects the vehicle speed by detecting the output rotation speed.

Note that when discussing the vehicle speed in the exemplary embodiments, except when explicitly defined as positive or negative therein, the vehicle speed is defined as an amount representing the size of the speed regardless of the movement direction. That is, the vehicle speed is expressed as a value of zero or greater. Additionally, "the vehicle speed increases" signifies that the vehicle speed moves away from zero; and "the vehicle speed decreases" signifies that the vehicle speed approaches zero. In cases where it is necessary to separately explain the advancing direction of the work vehicle 1, the advancing directions are defined as the "forward travel direction" and the "reverse travel direction". Additionally, except when explicitly defined as positive or negative in the exemplary embodiments, the rotation speed is also defined as an amount representing the size of the rotation speed regardless of the rotation direction. That is, the "rotation speed" is expressed as a value of zero or greater. Further, "the rotation speed increases" signifies that the rotation speed moves away from zero, and "the rotation speed decreases" signifies that the rotation speed approaches zero. In cases where it is necessary to separately explain the rotation direction, the rotation directions are defined as the "forward direction" and the "reverse direction".

The input rotation speed detector 38 detects the rotation speed of the input shaft 61 in the power transmission device 24 (referred to as "input rotation speed" below). The output rotation speed detector 37 sends the controller 27 a detection signal indicative of the output rotation speed. The input rotation speed detector 38 sends the controller 27 a detection signal indicative of the input rotation speed.

Note that, instead of an output rotation speed detector 37 and then input rotation speed detector 38, a speed detector that detects the rotation speed of rotation components inside the power transmission device 24 may be separately provided to send signals to the controller 27, and the controller 27 may then compute the input rotation speed and the output rotation speed from the rotation speed of the rotation components.

The operating device 26 is manipulated by an operator. The operating device 26 includes an accelerator operating device 51, a work-implement operating device 52, a gear shifting device 53, a forward-reverse travel operating device 54, a steering operating device 57, and a brake operating device 59.

The accelerator operating device 51 includes an accelerator operating member 51a, and an accelerator operation detector 51b. The operator manipulates the accelerator operating member 51a to establish a target rotation speed for the engine 21. The accelerator operation detector 51b detects the degree to which the accelerator operating member 51a is operated (termed "accelerator operation amount" below). The accelerator operation amount signifies the amount which the accelerator operating member 51a is pressed.

The work implement-operating device 52 includes a work implement operating member 52a and a work implement operation detector 52b. The work implement operating member 52a is manipulated by the operator to operate the work implement 3, and more specifically to operate the boom 11 and the bucket 12. Forward and backward manipulation of an operating member for the boom 11 corresponds to raising and lowering the boom 11. Forward and backward manipulation of an operating member for the bucket 12 corresponds to digging and dumping with the bucket 12. The work implement operation detector 52b detects the position of the work implement operating member 52a. The work implement operation detector 52b detects the position of the work implement operating member 52a from an electrical signal in accordance with the tilt angle of the work implement operating member 52a.

The gear shifting device 53 includes a gear-shift operating member 53a, and a gear-shift operation detector 53b. The operator may manipulate the gear-shift operating member 53a to select a gear stage for the power transmission device 24. The gear-shift operation detector 53b detects the gear stage designated by the gear-shift operating member 53a.

The forward-reverse travel operating device 54 includes a forward-reverse switching member 54a and a forward-reverse switch detector 54b. The operator may manipulate the forward-reverse switching member 54a to thereby switch the work vehicle 1 between forward and reverse travel. The forward-reverse switch detector 54b detects the position of the forward-reverse switching member 54a.

The steering operating device 57 includes a steering operating member 57a. A pilot pressure is supplied to the steering control valve 43 based on the operation of the steering operating member 57a allowing the steering operating device 57 to thereby drive the steering control valve 43. The operator may manipulate the steering operating member 57a to change the travel direction of the work vehicle 1 to the left or the right. Note that the steering operating device 57 may convert the operation of the steering operating member 57a into an electrical signal to actuate the steering control valve 43.

The brake operating device 59 includes a brake operating member 59a, and a braking operation detector 59b. The operator may manipulate the brake operating member 59a to operate the brake device (not shown) to generate a braking force for the work vehicle 1. The braking operation detector 59b detects the degree to which the brake operating member 59a is operated (termed "brake operation amount" below). The brake operation amount signifies the amount which the brake operating member 59a is pressed. The braking operation detector 59b outputs a detection signal to the controller 27 indicative of the brake operation amount.

The controller 27 includes a computing device, such as a CPU, and memory, such as RAM and ROM, and carries out processes for controlling the work vehicle 1. The controller 27 also includes an engine control unit 50, a motor control unit 55 and a clutch control unit 58 for controlling the power transmission device 24, and a storage unit 56. The details on the control of the power transmission device 24 are described later. The storage unit 56 stores programs and data for controlling the work vehicle 1.

More specifically, the storage unit 56 stores work implement control valve command value information defining a relationship between the work implement operation amount and a command current value sent to the work implement control valve 41. For instance, the work implement control valve command value information is a map defining the relationship between the work implement operation amount and the command current value sent to the work implement control valve 41. The work implement control valve command value information may be in a format different from a map, such as a table, or maybe a numerical formula. The aperture size of the work implement control valve 41 is set in accordance with the command current value. The work implement control valve command value information may define the command current value so that the aperture size of the work implement control valve 41 increases as much as the work implement operation amount increases. The controller 27 references the work implement control valve command value information and determines the command current value sent to the work implement control valve 41 using the work implement operation amount.

The controller 27 establishes a target rotation speed for the engine 21 in accordance with the accelerator operation amount. The controller 27 includes the engine control unit 50 for controlling the engine 21. The engine control unit 50 determines the amount of fuel to inject based on the target rotation speed for the engine 21 and the current engine rotation speed, and sends a command signal to the fuel injector 28. Thus, a rotation speed may be obtained for the engine which is responsive to the accelerator operation amount. The engine control unit 50 determines a torque output rate in relation to the maximum output torque of the engine 21 responsive to the accelerator operation amount. The engine control unit 50 may determine the amount of fuel to inject based on the torque output rate of the engine 21, and send a command signal to the fuel injector 28. Thus, a torque output may be obtained for the engine which is responsive to the accelerator operation amount. The controller 27 controls the work implement control valve 41 on the basis of a detection signal from the work implement operation detector 52b and thereby controls the hydraulic pressure supplied to the hydraulic cylinders 13 and 14. The hydraulic cylinders 13 and 14 thereby extend and retract, moving the work implement 3.

Figure 3:
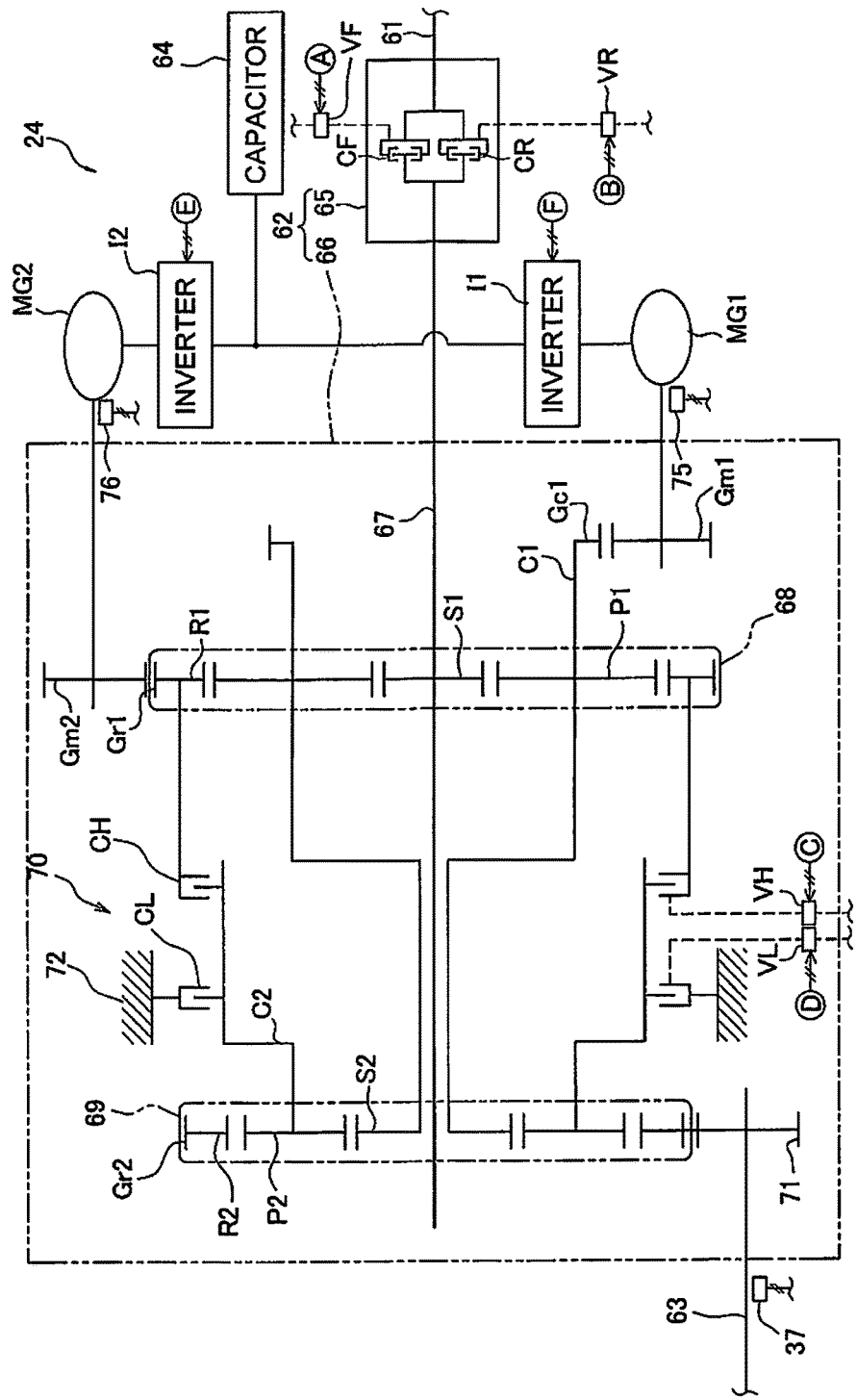
FIG. 3 is a schematic view illustrating a configuration of a power transmission device.

The details on the configuration of the power transmission device 24 are described next. FIG. 3 is a schematic view illustrating a configuration of the power transmission device 24. As illustrated in FIG. 3, the power transmission device 24 is provided with an input shaft 61, a gear mechanism 62, the output shaft 63, a first motor MG1, a second motor MG2, and a capacitor 64. The input shaft 61 is connected to the above described PTO 22. The rotations of the engine 21 are received by the input shaft 61 via the PTO 22. The gear mechanism 62 transmits the rotations of the input shaft 61 to the output shaft 63. The output shaft 63, connected to the above-described travel apparatus 25, transmits the rotations from the gear mechanism 62 to the travel apparatus 25.

The gear mechanism 62 is a mechanism for transmitting the drive power from the engine 21. Using the gear mechanism 62 to vary the rotation speed of the motors MG1 and MG2 varies the transmission speed ratio, which is a ratio of the rotation speed of the output shaft to the rotation speed of the input shaft. The gear mechanism 62 includes a forward-reverse switching mechanism 65, and a gear shifting mechanism 66.

The forward-reverse switching mechanism 65 includes a forward travel clutch CF (termed "F-clutch CF", below), a reverse travel clutch CR (termed "R-clutch CR", below), and various gears (not shown). The F-clutch CF and the R-clutch CR are hydraulic clutches, with the transmission pump 29 supplying the hydraulic fluid to each of clutches CF and CR. An F-clutch control valve VF controls the hydraulic fluid supplied to the F-clutch CF. An R-clutch control valve VR controls the hydraulic fluid supplied to the R-clutch CR. The clutch control valves VF and VF are controlled via the command signals from the clutch control unit 58. Connecting and disconnecting the F-clutch CF and the R-clutch CR changes the direction of rotation output from the forward-reverse switching mechanism 65.

The gear shifting mechanism 66 includes a power transmission shaft 67, a first planetary gear mechanism 68, a second planetary gear mechanism 69, a mode switching mechanism 70, and an output gear 71. The power transmission shaft 67 is connected to the forward-reverse switching mechanism 65.

The first planetary gear mechanism 68 includes a first sun gear S1, a plurality of first planetary gears P1, a first carrier C1 supporting the plurality of first planetary gears P1, and a first ring gear R1. The first sun gear S1 is connected to the power transmission shaft 67. The plurality of first planetary gears P1 engages with the first sun gear S1 and is rotatably supported on the first carrier C1. A first carrier gear Gc1 is provided on the outer periphery of the first carrier C1. The first ring gear R1 is able to rotate while engaged with the plurality of planetary gears P1. The first ring gear R1 also is provided with a first outer ring gear Gr1 at the outer periphery thereof.

The second planetary gear mechanism 69 includes a second sun gear S2, a plurality of second planetary gears P2, a second carrier C2 supporting the plurality of second planetary gears P2, and a second ring gear R2. The second sun gear S2 is connected to the first carrier C1. The plurality of second planetary gears P2 engages with the second sun gear S2 and is rotatably supported on the second carrier C2. The second ring gear R2 is able to rotate while engaged with the plurality of planetary gears P2. The second ring gear R2 also is provided with a second outer ring gear Gr2 at the outer periphery thereof. The second outer ring gear Gr2 engages with the output gear 71 whereby the rotation of the second ring gear R2 is output to the output shaft 63 via the output gear 71.

The mode switching mechanism 70 switches the drive power transmission route in the power transmission device to one mode of at least two modes. The at least two modes includes a first mode, and a second mode. In the embodiment, the first mode is a low-speed mode (Lo mode) wherein the vehicle speed is low, and the second mode is a high-speed mode (Hi mode) where the vehicle speed is high. The Hi mode is used in a range of transmission speed ratios that are higher than the transmission speed ratios in Lo mode (refer to FIG. 4). The mode switching mechanism 70 includes an H-clutch CH, which is connected during the Hi mode, and an L-clutch CL, which is connected during the Lo mode. The H-clutch CH connects or disconnects the first ring gear R1 and the second carrier C2. Additionally, the L-clutch CL connects or disconnects the second carrier C2 and a fixed end 72, thereby prohibiting or permitting rotation of the second carrier C2.

The clutches CH and CL are hydraulic clutches, with the transmission pump 29 supplying the hydraulic fluid thereto. The hydraulic fluid bound for the H-clutch CH is controlled by an H-clutch control valve VH. The hydraulic fluid bound for the L-clutch CL is controlled by an L-clutch control valve VL. The clutch control valves VH and VL are controlled via the command signals from the clutch control unit 58. That is, the clutch control unit 58 outputs a clutch command signal to the H-clutch control valve VH and to the L-clutch control valve VL to thereby switch the H-clutch CH and the L-clutch CL.

The first motor MG1 and the second motor MG2 function as drive motors that generate drive power from electrical energy. The first motor MG1 and the second motor MG2 also function as generators that use the drive power input therein to generate electrical energy. The motor control unit 55 may provide a command signal to the first motor MG1 causing a torque reversed from the rotation direction of the first motor MG1 to act thereon. In this case, the first motor MG1 acts as a generator. A first motor gear Gm1 is secured to the output shaft of the first motor MG1. The first motor gear Gm1 engages with the first carrier gear Gc1. That is, the first motor MG1 is connected to a rotation element in the first planetary gear mechanism 68.

The first motor MG1 is connected to a first inverter I1. The first inverter I1 receives a motor command signal from the motor control unit 55 for controlling the motor torque in the first motor MG1. A first motor speed detector 75 detects the rotation speed of the first motor MG1. The first motor speed detector 75 sends the controller 27 a detection signal indicative of the rotation speed of the first motor MG1 via the first inverter I1.

The second motor MG2 is configured identically as the first motor MG1. A second motor gear Gm2 is secured to the output shaft of the second motor MG2. The second motor gear Gm2 engages with the first outer ring gear Gr1. That is, the second motor MG2 is connected to a rotation element in the first planetary gear mechanism 68. The second motor MG2 is also connected to a second inverter I2. The second inverter I2 receives a motor command signal from the motor control unit 55 for controlling the motor torque in the second motor MG2. A second motor speed detector 76 detects the rotation speed of the second motor MG2. The second motor speed detector 76 sends the controller 27 a detection signal indicative of the rotation speed of the second motor MG2 via the second inverter I2.

The capacitor 64 functions as an energy storage unit storing the energy generated by the motors MG1 and MG2. That is, the capacitor 64 stores the power generated by the motors MG1 and MG2 when the motors MG1 and MG2 act as generators. Note that another electric storage means, such as a battery, may be used in place of the capacitor. The capacitor 64 may be excluded when each of the motors MG1 and MG2 can be driven by having one of the motors MG1 and MG2 generating energy and the other receiving energy.

The motor control unit 55 receives the detection signals from the various detectors and provides each of the inverters I1 and I2 with the command signals representing a commanded torque sent to the motors MG1 and MG2. Note that the motor control unit 55 may output a rotation speed command to the motors MG1 and MG2. In this case, the inverters I1 and I2 calculate a commanded torque in accordance with the rotation speed command to control the motors MG1 and MG2. The clutch control unit 58 may also provide the clutch control valves VF, VR, VH and VL with command signals for controlling the clutch hydraulic pressure in the clutches CF, CR, CH, and CL. Hereby, the gear ratio and the output torque of the power transmission device 24 are controlled. The operations of the power transmission device 24 are described below.

Figure 4:
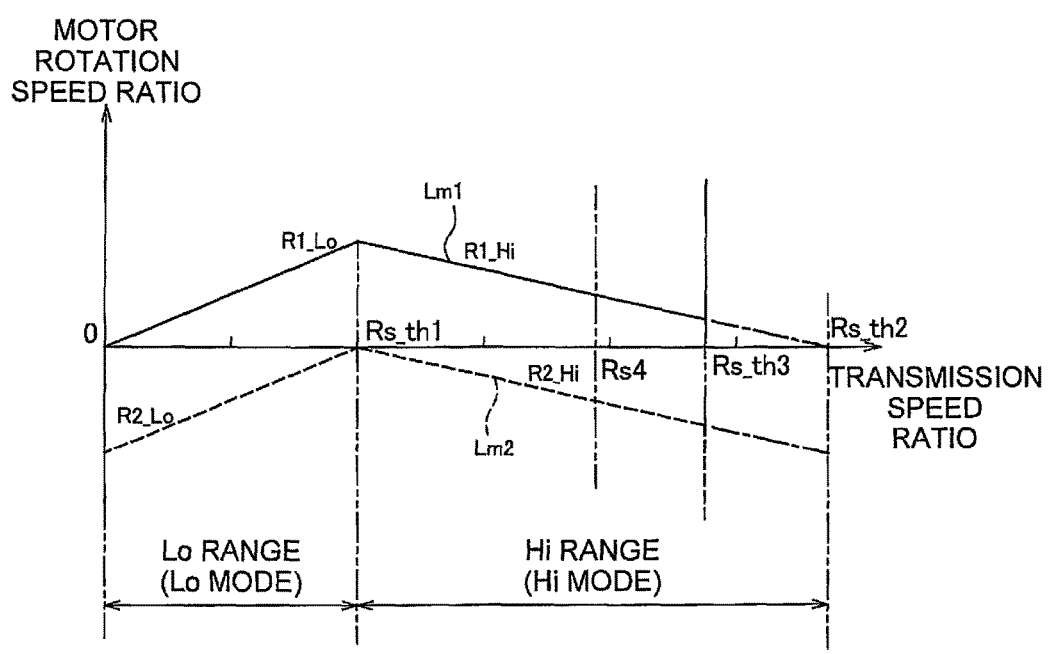
FIG. 4 illustrates change in the rotation speed ratios of a first motor and a second motor in relation to the transmission speed ratio of the power transmission device.

The overall operations of the power transmission device 24 are described with reference to FIG. 4; here, the vehicle speed increases from zero to forward travel while the rotation speed of the engine 21 is kept constant. FIG. 4 illustrates the rotation speed ratios in each of the motors MG1 and MG2 in relation to the transmission speed ratio of the power transmission device 24. The transmission speed ratio is the proportion of the rotation speed of the output shaft 63 to the rotation speed of the input shaft 61. The rotation speed ratio in the first motor MG1 is the proportion of the rotation speed of an output shaft in the first motor MG1 to the rotation speed of the input shaft 61. The speed ratio in the second motor MG2 is the proportion of the rotation speed of an output shaft in the second motor MG2 to the rotation speed of the input shaft 61. In FIG. 4, the rotation direction of the first motor MG1 when the work vehicle 1 travels forward is assumed to be the forward direction; a positive rotation speed ratio represents the motors MG1 and MG2 rotating in the forward direction, and a negative rotation speed ratio represents the motors rotating in the reverse direction. The vehicle speed varies depending on the transmission speed ratio of the power transmission device 24 when the rotation speed of the engine 21 is constant. Therefore in FIG. 4, changes in the transmission speed ratio of the power transmission device 24 correspond to the changes in the vehicle speed. In other words, FIG. 4 illustrates a relationship between the rotation speed of the motors MG1 and MG2 and the vehicle speed. The solid line Lm1 in FIG. 4 represents the rotation speed of the first motor MG1, and the dash line Lm2 represents the rotation speed of the second motor MG2.

The L-clutch CL is connected and the H-clutch CH is disconnected in a Lo range (i.e., Lo mode) where the transmission speed ratio is greater than or equal to zero and less than or equal to a first threshold Rs_th1. The first threshold Rs_th1 is a mode switching threshold used for determining when to switch modes. Given that the H-clutch CH is disconnected in the Lo range, the second carrier C2 and the first ring gear R1 are disconnected. In addition, the L-clutch CL is connected, and therefore the second carrier C2 is fixed.

Within the Lo range the drive power from the engine 21 is input into the first sun gear S1 via the power transmission shaft 67, and thereby the drive power is output from the first carrier C1 to the second sun gear S2. Whereas, the drive power input into the first sun gear S1 is transmitted from the first planetary gears P1 to the first ring gear R1, and thereby the drive power is output to the second motor MG2 via the first outer ring gear Gr1 and the second motor gear Gm2. Given that the second motor MG2 acts as a generator in the Lo range while the work vehicle 1 is powering up, a portion of the electricity generated by the second motor MG2 may be supplied to the first motor MG1. Alternatively, a portion of the electricity generated by the second motor MG2 may be stored in the capacitor 64.

While the work vehicle 1 is powering up the first motor MG1 functions as an electric motor driven by the electricity supplied from the second motor MG2 or the capacitor 64 in the Lo range. The drive power from the first motor MG1 is output to the second sun gear S2 via the first motor gear Gm1, the first carrier gear Gc1, and the first carrier C1 respectively. The drive power output to the second sun gear S2 as above described is transmitted to the output shaft 63 via the second planetary gears P2, the second ring gear R2, the second outer ring gear Gr2, and the output gear 71 respectively.

The rotation speed of the second motor MG2 then becomes zero at the first threshold Rs_th1. That is, the second motor MG2 is maintained in non-rotating state.

The H-clutch CH is connected and the L-clutch CL is disconnected in the Hi range (i.e., Hi mode) where the transmission speed ratio is greater than or equal to the first threshold Rs_th1. Given that the H-clutch CH is connected in the Hi range, the second carrier C2 and the first ring gear R1 are connected. In addition, the L-clutch CL is disconnected, and therefore the second carrier C2 is released. Consequently the rotation speed of the first ring gear R1 and the second carrier C2 coincide.

In the Hi range the drive power from the engine 21 is input into the first sun gear S1, and thereby the drive power is output from the first carrier C1 to the second sun gear S2. Additionally, the drive power input into the first sun gear S1 is output to the first motor MG1 from the first carrier C1 via the first carrier gear Gc1 and the first motor gear Gm1. Given that the first motor MG1 acts as a generator in the Hi range while the work vehicle 1 is powering up, a portion of the electricity generated by the first motor MG1 may be supplied to the second motor MG2. Alternatively, a portion of the electricity generated by the first motor MG1 may be stored in the capacitor 64.

While the work vehicle 1 is powering up the second motor MG2 functions as an electric motor driven by the electricity supplied from the first motor MG1 or the capacitor 64 as necessary. The drive power from the second motor MG2 is output to the second carrier C2 via the second motor gear Gm2, the first outer ring gear Gr1, the first ring gear R1, and the H-clutch CH respectively. Output to the second sun gear S2 in the above-described manner, the drive power is output to the second ring gear R2 via the second planetary gears P2, and the drive power output from a second carrier C2 is output to the second ring gear R2 via the second planetary gears P2. The drive power made to coincide via the second ring gear R2 is transmitted to the output shaft 63 via the second outer ring gear Gr2 and the output gear 71.

In the exemplary embodiments, the transmission speed ratio is not allowed to exceed a predetermined third threshold $Rs\_th3$. In Hi mode, the third threshold $Rs\_th3$ is greater than a transmission speed ratio $Rs4$ at which the rotation speed ratio in the first motor MG1 and the rotation speed ratio in the second motor MG2 are equal. The transmission speed ratio $Rs4$ is greater than the first threshold $Rs\_th1$ and less than a second threshold $Rs\_th2$. Here, the second threshold $Rs\_th2$ represents the transmission speed ratio at which, in Japanese laid-open Patent Application Publication No. 2006-329244, the rotation speed of the first motor MG1 becomes zero (this corresponds to the transmission speed ratio at the vehicle speed V2 in FIG. 14). Additionally, the third threshold $Rs\_th3$ is greater than or equal to the transmission speed ratio $Rs4$ and less than the second threshold $Rs\_th2$. Note that power recirculates through the power transmission device 24 when attempting to increase the transmission speed ratio beyond the second threshold $Rs\_th2$. In the power recirculation range, internal loss increases, and the power transmission efficiency worsens. The power transmission device preferably operates while avoiding a transmission speed ratio in a power transmission range that causes the power to recirculate. Accordingly, the second threshold $Rs\_th2$ is selected as the maximum value of the transmission speed ratio obtainable by the power transmission device 24. Here, "normal travel mode" refers to the mode of the power transmission device when the transmission speed ratio is between zero and the third threshold $Rs\_th3$.

When the vehicle speed of the work vehicle 1 is further increased after the transmission speed ratio reaches the third threshold $Rs\_th3$, the transmission speed ratio is kept constant at the third threshold $Rs\_th3$, and the rotation speed of the engine 21 is increased. In this case the power transmission device 24 is referred to as being in a high-speed travel mode. In the high-speed travel mode, the rotation speed of the first motor MG1 and the second motor MG2 increases as the rotation speed of the engine 21 increases. FIG. 5A illustrates the change in the rotation speeds of the first motor MG1 and the second motor MG2 in relation to the vehicle speed of the work vehicle 1. FIG. 5B illustrates the change in the rotation speed of the engine 21 in relation to the vehicle speed of the work vehicle 1. The (solid) line Lm1 represents the rotation speed of the first motor MG1, and the (dotted) line Lm2 represents the rotation speed of the second motor MG2 in FIG. 5A. In FIG. 5A, the rotation direction of the first motor when the work vehicle 1 travels forward is assumed to be the forward direction; a positive rotation speed represents the motors MG1 and MG2 rotating in the forward direction, and a negative rotation speed represents the motors rotating in the reverse direction. As is clear from FIG. 5B, the rotation speed of the engine 21 is constant (Ne3) from a vehicle speed of zero up to a vehicle speed of V3 and increases from Ne3 up to Ne6 in correspondence with the vehicle speeds from V3 up to V6.

When the vehicle speed is V1, the transmission speed ratio is at the first threshold $Rs\_th1$. When the vehicle speed is V3, the transmission speed ratio is the third threshold $Rs\_th3$. When the vehicle speed is V4, the transmission speed ratio is $Rs4$. Note that the rotation speed Nm14 of the first motor MG1 and the rotation speed Nm24 of the second motor MG2 are equal at the vehicle speed V4. The vehicle speed V6 is the limit value for the vehicle speed when the transmission speed ratio increases to the third threshold $Rs\_th3$ and is constant thereat, and the rotation speed of the engine 21 increases. Note that the rotation speed of the second motor MG2 reaches the rotation speed limit value $Nm\_lim2$ of the second motor MG2 at the vehicle speed V6. The limit value $Nm\_lim2$ is the maximum speed value at which the second motor MG2 can be used.

Figure 14:
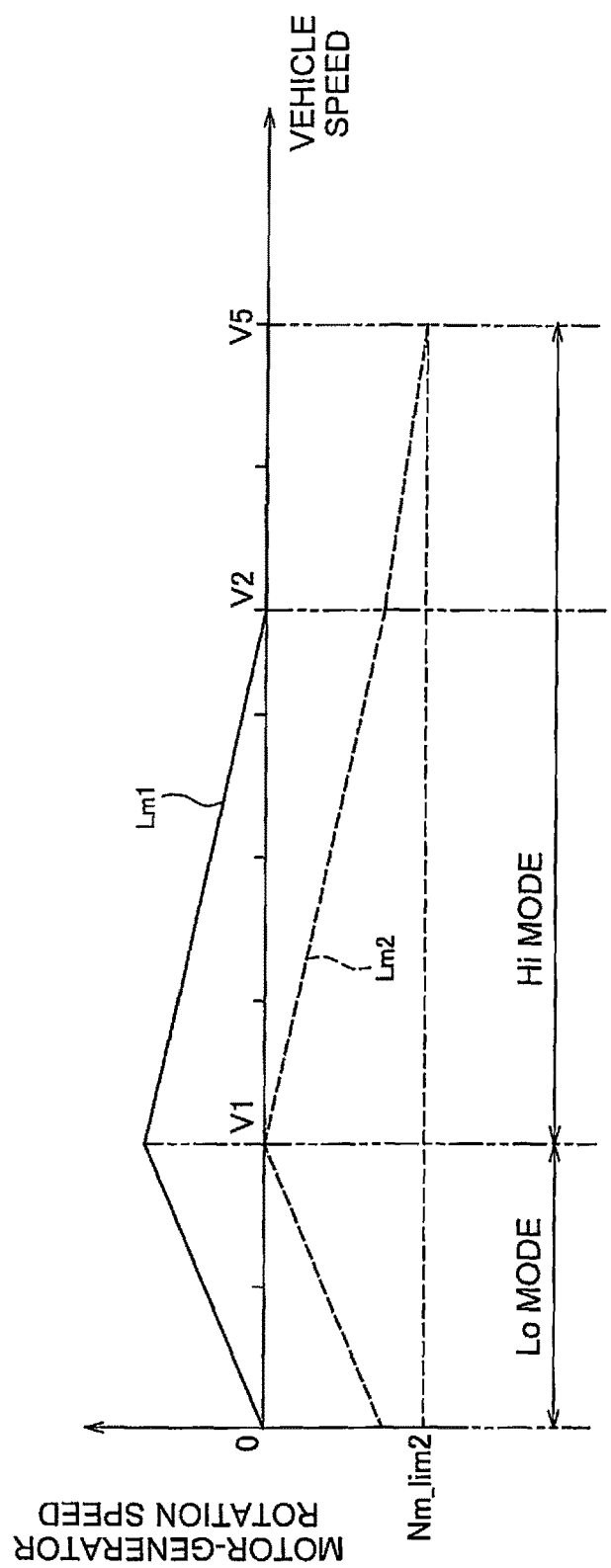
FIG. 14 illustrates the changes in the rotation speeds of a first motor and a second motor in relation to the vehicle speed according to a related art.

In order to compare FIGS. 5A and 5B, and FIG. 14, at or beyond the vehicle speed V3 the changes in the vehicle speed and the rotation speed of the first motor MG1, the second motor MG2, and the engine 21 when the power transmission device 24 is controlled using the method described for FIG. 14 are represented by dash-dot lines. At the vehicle speed V2 the rotation speed of the engine 21 is kept at Ne3 and the transmission speed ratio increases up to the second threshold $Rs\_th2$. The vehicle speed V5 is the limit value for the vehicle speed when the transmission speed ratio increases up to the second threshold $Rs\_th2$ and is constant thereat, and the rotation speed of the engine 21 increases. Similarly to FIG. 4, dash-dot lines are used to represent the changes in the transmission speed ratio and the rotation speed ratios of the first motor MG1 and the second motor MG2 when the power transmission device 24 is controlled based on the method described for FIG. 14.

Note that the roles of the first motor MG1 and the second motor MG2 are the opposite while braking the work vehicle 1. Although the process for forward travel is described above, the operations are identical for reverse travel. Additionally, the first threshold $Rs\_th1$, the second threshold $Rs\_th2$, and the third threshold $Rs\_th3$ are stored in the storage unit 56.

An outline of the operations of the power transmission device 24 are described using collinear plots. The reference signs Ns1 and Zs1 represent the rotation speed of and number of gears in the first sun gear S1 in the first planetary gear mechanism 68. The reference sign Nc1 represents the rotation speed of the first carrier C1. The reference signs Nr1 and Zr1 represent the rotation speed of and number of gears in the first ring gear R1. The reference signs Ns2 and Zs2 represent the rotation speed of and number of gears in the second sun gear S2 in the second planetary gear mechanism 69. The reference sign Nc2 represents the rotation speed of the second carrier C2. The reference signs Nr2 and Zr2 represent the rotation speed of and number of gears in the second ring gear R2. Noting the relationships between the rotation speeds of and the number of gears in the rotation elements in the first planetary gear mechanism 68 and the second planetary gear mechanism 69 as collinear plots produces FIGS. 6A-6C.

Figure 6A:
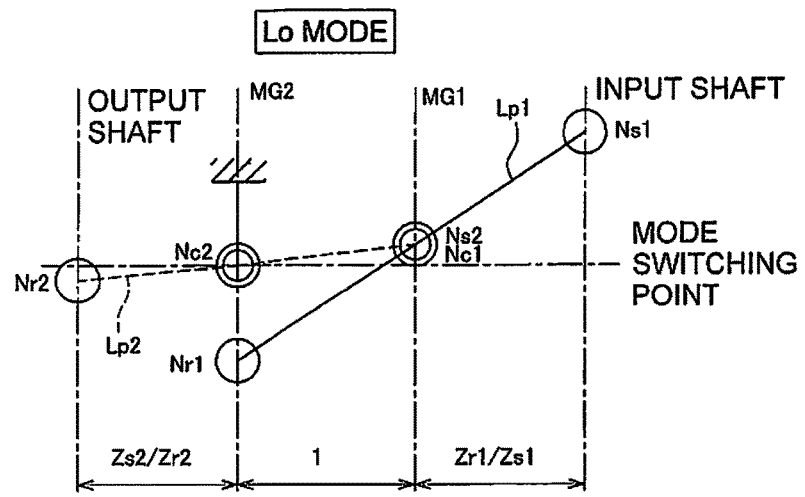
FIGS. 6A-6C present collinear plots representing the relationships between the rotation speeds of and the number of gears in rotation elements in a first planetary gear mechanism and a second planetary gear mechanism.
Figure 6B:
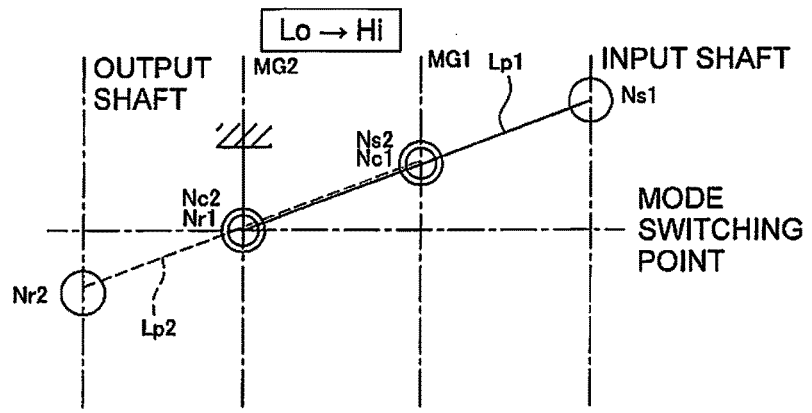
Figure 6C:
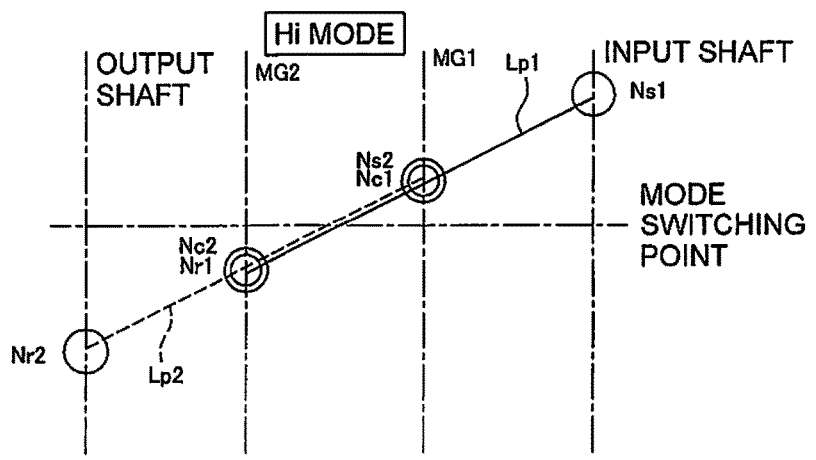

In the collinear plot, the relationship between the rotation speeds of each of the elements in the planetary gear mechanisms is expressed as a straight line. Accordingly, the Ns1, Nc1, and Nr1 lie on a straight line as illustrated in FIGS. 6A-6C. The Ns2, Nc2, and Nr2 also lie on a straight line. Note that the solid line Lp1 in FIGS. 6A-6C represents the relationship between the rotation speed of the elements in the first planetary gear mechanism 68. The dash line Lp2 represents the relationship between the rotation speeds of the elements in the second planetary gear mechanism 69.

FIG. 6A illustrates the rotation speed of the elements during Lo mode. As described above, to simplify the description note that Ns1 is constant when the rotation speed of the engine 21 is constant. Here, the engine is assumed to rotate in the forward direction. In order for the rotation speed of the second motor MG2 to be zero at the later-described mode switching point, the rotation speed becomes zero along the mode switching point. The region below the dash-dot line representing the mode switching point indicates that either the second motor MG2 or the output shaft 63 is rotating in the reverse direction. In Lo mode, increasing the rotation speed of the first motor MG1 increases Nc1. Consequently, Nr1 decreases when Nc1 increases. The rotation speed of the second motor MG2 thus decreases. The first carrier C1 is connected to the second sun gear S2 in the power transmission device 24. Consequently, Nc1 and Ns2 coincide. Therefore, Ns2 increases as Nc1 increases. In Lo mode the second carrier C2 is fixed to the fixed end 72. Thus, Nc2 is kept at zero. Increasing Ns2 therefore increases Nr2 in the reverse direction. Hereby the transmission speed ratio of the power transmission device 24 increases. In this manner, in Lo mode the transmission speed ratio in the power transmission device 24 increases as the rotation speed in the first motor MG1 increases.

As illustrated in FIG. 6B Nr1 is zero when the transmission speed ratio of the power transmission device 24 reaches the above-described first threshold Rs_th1. The rotation speed of the second motor MG2 is thus becomes zero. Switching from Lo mode to Hi mode is performed at that point. In other words, the L-clutch CL is switched from being connected to being disconnected. The second carrier C2 is thereby detached from the fixed end 72, to be able to rotate. The H-clutch CH is also switched from being disconnected to being connected. Consequently, the first ring gear R1 and the second carrier C2 are connected.

FIG. 6C illustrates the rotation speed of the elements during Hi mode. In Hi mode, Nr1 and Nc2 coincide because the first ring gear R1 and the second carrier C2 are connected. In addition, Nc1 and Ns2 coincide because the first carrier C1 and the second sun gear S2 are connected as above described. Accordingly, the rotation speed of the second motor increases in the reverse direction, and Nr1 and Nc2 increases in the reverse direction. The rotation speed of the second ring gear Nr2 increases in the reverse direction, due to Nc2 increasing in the reverse direction. Hereby the transmission speed ratio of the power transmission device 24 increases. In this manner, the transmission speed ratio in the power transmission device 24 increases as the rotation speed of the second motor MG2 increases in the reverse direction. The increase of the rotation speeds Nr1 and Nc2 in the reverse direction reduces the rotation speeds Ns2 and Nc1. The rotation speed of the first motor MG1 thus decreases. Assuming the transmission speed ratio of the power transmission device 24 changes up to the above-described second threshold Rs_th2, Ns2 and Nc1 become zero. The rotation speed of the first motor MG1 is thus becomes zero. Note that the operation described above is the switch from Lo mode to Hi mode; the above-mentioned operation is executed in the reverse sequence when switching from Hi mode to Lo mode.

As above described, when the rotation speed of the engine 21 is constant, that is, when the rotation speed of the input shaft 61 is constant, the rotation speed of the first motor MG1 increases in accordance with the increase in the transmission speed ratio during Lo mode. In addition, during Hi mode the rotation speed of the first motor MG1 decreases in accordance with the increase in the transmission speed ratio. Accordingly, as illustrated in FIG. 4, during Lo mode the transmission speed ratio varies in relation to the rotation speed ratio in the first motor MG1 by a rate of change R1_Lo. However, in Hi mode the transmission speed ratio varies in relation to the rotation speed ratio in the first motor MG1 by the rate of change R1_Hi which is different from the rate of change R1_Lo during Lo mode. More specifically, the rate of change R1_Hi during the Hi mode and the rate of change R1_Lo during Lo mode have different signs. Finally, the rotation speed ratio in the first motor MG1 during Lo mode and the rotation speed ratio of the first motor MG1 during Hi mode are equal when the transmission speed ratio is at the first threshold Rs_th1.

When the rotation speed of the engine 21 is constant, that is, when the rotation speed of the input shaft 61 is constant, the rotation speed of the second motor MG2 in the reverse direction decreases in accordance with the increase in the transmission speed ratio during Lo mode. During Hi mode the rotation speed of the second motor MG2 increases in the reverse direction in accordance with the increase in the transmission speed ratio. Accordingly, as illustrated in FIG. 4, during Lo mode, the transmission speed ratio varies in relation to the rotation speed ratio in the second motor MG2 by a rate of change R2_Lo. However, in Hi mode the transmission speed ratio varies in relation to the rotation speed ratio in the second motor MG1 by the rate of change R2_Hi which differs from the rate of change R2_Lo during Lo mode. More specifically, the rate of change R2_Hi during Hi mode and the rate of change R2_Lo during Lo mode have different signs. Finally, the rotation speed ratio in the second motor MG2 during Lo mode and the rotation speed ratio in the second motor MG2 during Hi mode are equal when the transmission speed ratio is at the first threshold Rs_th1.

Figure 7A:
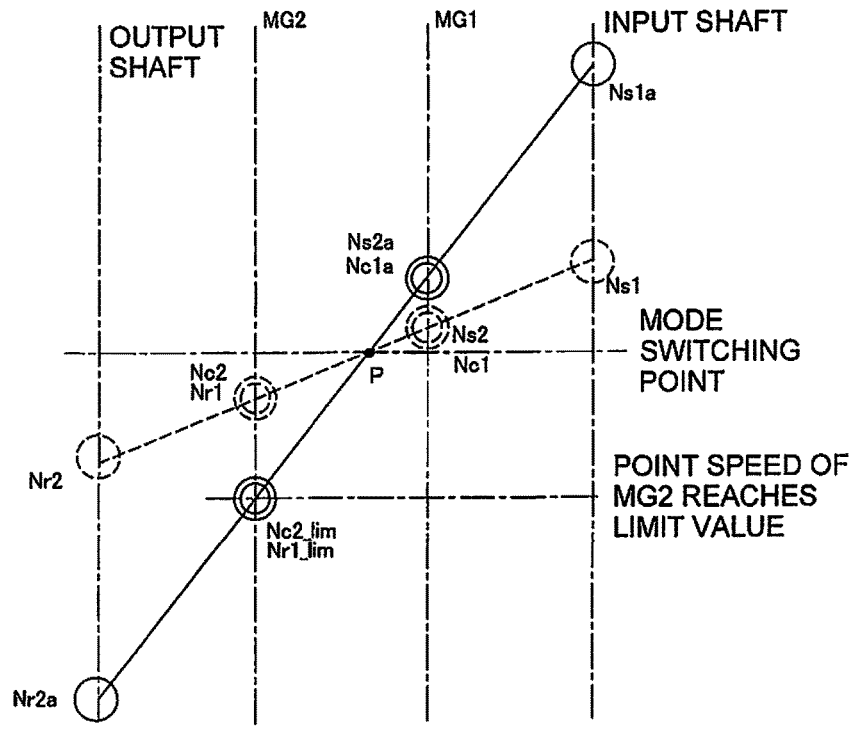
FIGS. 7A and 7B present collinear plots used to describe the similarities and differences of operations in the power transmission device when a threshold for holding the transmission speed ratio is exceeded.
Figure 7B:
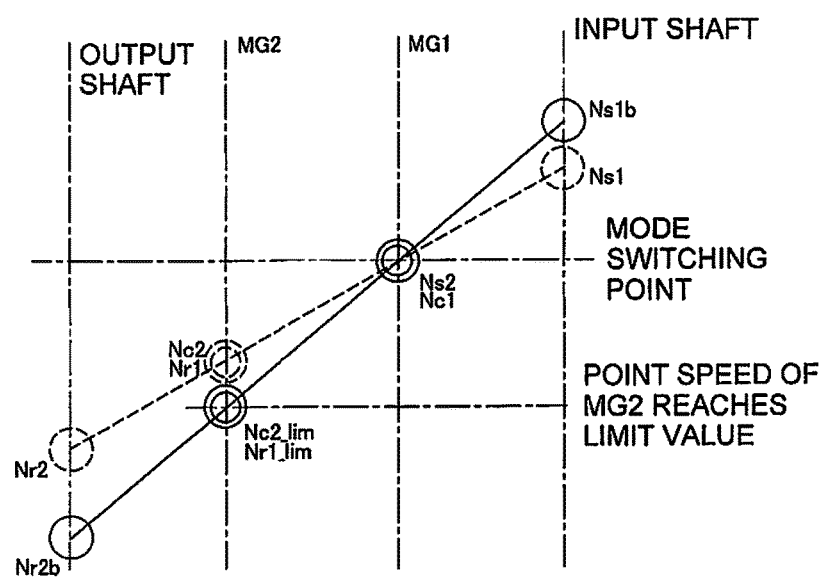

Next the differences in the operation of the power transmission device 24 are described using a collinear plots; specifically, while increasing the engine rotation speed and keeping the transmission speed ratio at the third threshold Rs_th3, and while increasing the engine rotation speed and keeping the transmission speed ratio at the second threshold Rs_th2. FIG. 7A is a collinear plot where the engine rotation speed is increased and the transmission speed ratio is kept at the third threshold Rs_th3. FIG. 7B is a collinear plot where the engine rotation speed is increased and the transmission speed ratio is kept at the second threshold Rs_th2. Given that FIGS. 7A and 7B both illustrate operations during Hi mode, the solid line Lp1 and the dash line Lp2 are represented as single straight lines so that the lines Lp1, Lp2 lie on a straight line. The dotted line in FIG. 7A represents the rotation speed of each of the rotation shafts while the transmission switches from the normal travel mode to the high-speed travel mode. The solid line in FIG. 7A represents the rotation speed of each of the rotation shafts when the rotation speed of the second motor MG2 reaches the limit value Nm_lim2. The dotted line in FIG. 7B represents the rotation speed of each of the rotation shafts assuming the transmission speed ratio increases up to the second threshold Rs_th2, and the engine rotation speed is the same as the value of the dotted line in FIG. 7A. The solid line in FIG. 7B represents the rotation speed of each of the rotation shafts when the transmission speed ratio is kept at the second threshold Rs_th2 and the rotation speed of the second motor MG2 reaches the limit value Nm_lim2.

As is clear from referring to FIG. 7B, once the transmission speed ratio increases to the second threshold Rs_th2, given the relationship between the gear ratios between each of the shafts illustrated in FIG. 6A, the rotation speed of the output shaft can only vary up to $Nr2b=Nr1\_lim \times (1+Zs2/Zr2)$. Note that Nr1_lim represents the rotation speed of the first ring gear R1 when the rotation speed of the second motor MG2 reaches the limit value Nm_lim2. The rotation speed Nr1_lim equals the rotation speed Nc2_lim of the second carrier C2 when the rotation speed of the second motor MG2 reaches the limit value Nm_lim2. The vehicle speed V5 in FIG. 5 corresponds to the rotation speed Nr2$b$ of the output shaft. Finally, as illustrated by the dash-dot lines in FIG. 5, the rotation speed of the second motor MG2 changes linearly in relation to the vehicle speed from the vehicle speeds V2 to V5 because Nc1=Ns2=0, and because Ns2, Nc2(Nc2_lim), and Nr2(Nr2$b$) lie on a straight line.

Whereas, in the example illustrated in FIG. 7A the ratio between Ns1 and Nr2 remains unchanged because the transmission speed ratio is kept at the third threshold Rs_th3. Therefore, the straight line passing through Ns1, Ns2, Nc2, and Nr2 will also pass through the point P in FIG. 7A regardless of how the rotation speed Ns1 of the input shaft varies. Given this requirements, and the relationship between the gear ratios between each of the shafts illustrated in FIG. 6A, the rotation speed of the output shaft varies up to Nr2$a$=Nr1_lim×(1+Zs2/Zr2×(Nc1$a$+Nc2_lim)/Nc2_lim). Note that, Nr2$a$>Nr2$b$ because Nr2$b$=Nr1_lim×(1+Zs2/Zr2). Additionally, the rotation speed Nr2$a$ of the output shaft corresponds to the vehicle speed V6 in FIGS. 5A and 5B, and the rotation speed Nr2$b$ of the output shaft corresponds to the vehicle speed V5 in FIGS. 5A and 5B. In other words, the limit value for the vehicle speed can be increased from V5 to P6 by keeping the transmission speed ratio at the third threshold Rs_th3 which is less than a second threshold Rs_th2 and increasing the rotation speed of the engine 21. Finally, in FIGS. 5A and 5B, the rotation speed of the second motor MG2 changes linearly in relation to the vehicle speed from the vehicle speeds V3 to V6 because the point P, Nc2(Nc2_lim), and Nr2(Nr2$a$) lie on a straight line.

The control of the power transmission device 24 by the controller 27 is described next. The controller 27 controls the motor torque in the first motor MG1 and in the second motor MG2 to thus control the output torque of the power transmission device 24. In other words, the controller 27 controls the motor torque in the first motor MG1 and in the second motor MG2 to thus control the traction force and the braking force of the work vehicle 1.

A method of setting the command value for the motor torque (hereafter, "commanded torque") sent to the first motor MG1 and the second motor MG2 is described below. In the explanation that follows, a method for determining the commanded torque during normal travel mode is described first; a method for determining the commanded torque during high-speed mode is described thereafter focusing on the differences with the determinations made during the normal travel mode.

Figure 8:
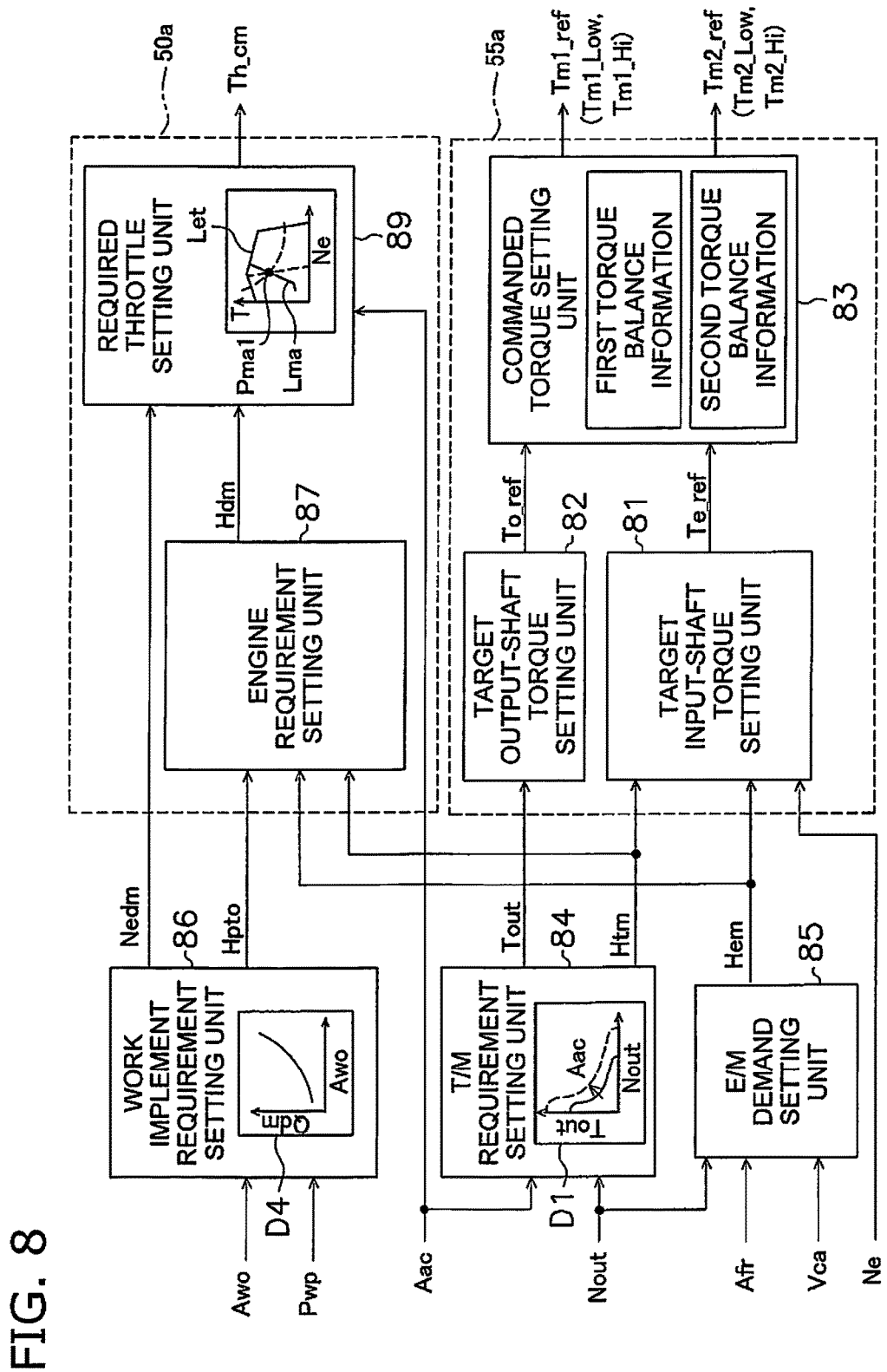
FIG. 8 is a control block diagram illustrating the process carried out by a controller.

FIG. 8 is a controlled block diagram illustrating the process carried out by the controller 27. As illustrated in FIG. 8 the controller 27 includes a transmission requirement setting unit 84, an energy management requirement setting unit 85, and a work implement requirement setting unit 86.

The transmission requirement setting unit 84 determines a required traction force Tout on the basis of the accelerator operation amount Aac and the output rotation speed Nout. More specifically the transmission requirement setting unit 84 determines the required traction force Tout from the output rotation speed Nout on the basis of a required traction force characteristic information D1 stored in the storage unit 56. The required traction force characteristic information D1 is data representing a required traction force characteristic which defines the relationship between the output rotation speed Nout and the required traction force Tout. The required traction force characteristic varies in accordance with the accelerator operation amount. The required traction force characteristic corresponds to a prescribed vehicle speed to traction force characteristic. The transmission requirement setting unit 84 uses a required traction force characteristic based on the accelerator operation amount to determine the required traction force Tout from the output rotation speed Nout, and determines the transmission required power from the product of the output rotation speed Nout and the required traction force Tout.

Figure 9:
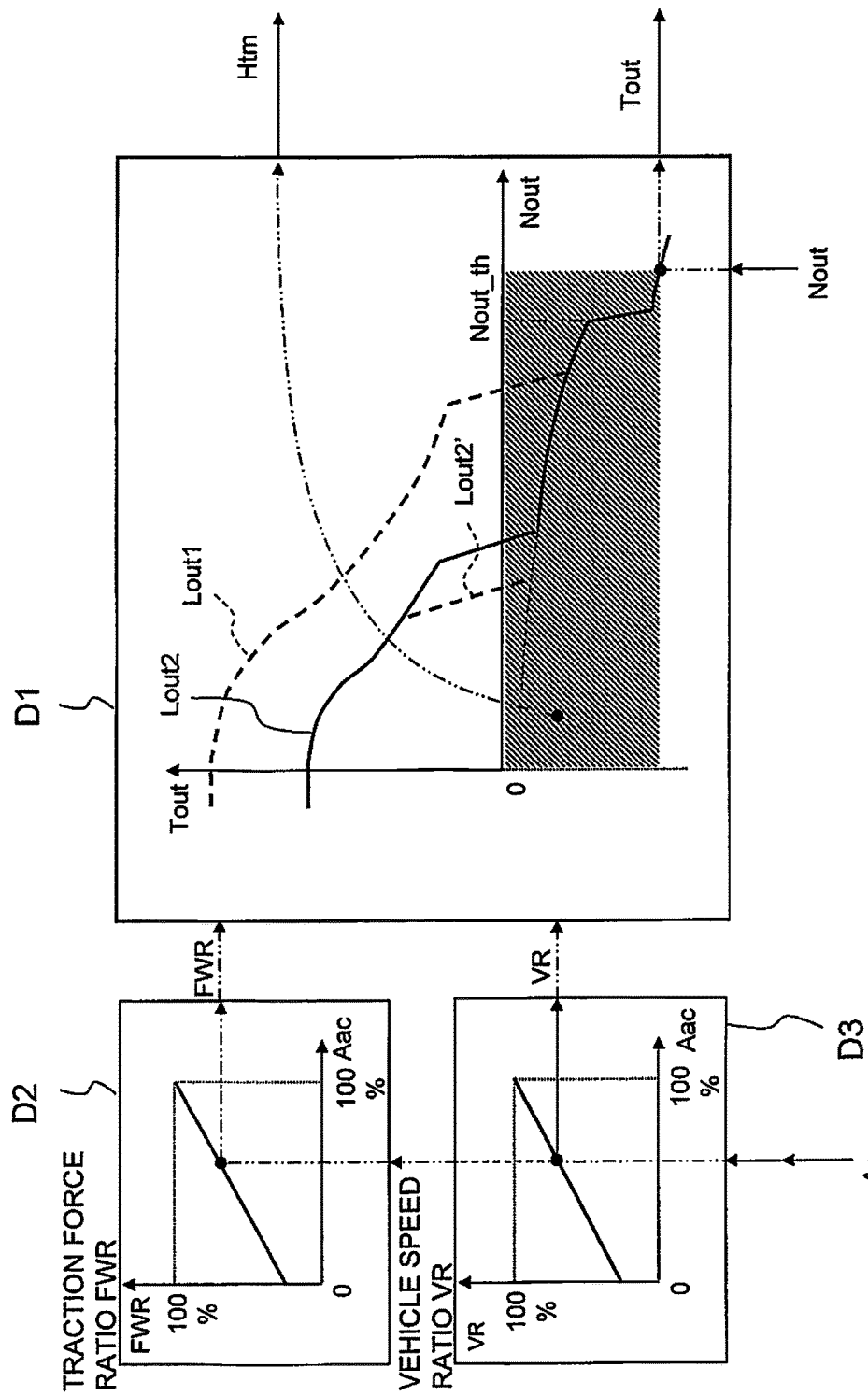
FIG. 9 is a graph illustrating one example of a required traction force characteristic.

More specifically, as illustrated in FIG. 9, the storage unit 56 stores data Lout1 representing a required traction force characteristic used as a reference ("reference traction force characteristic Lout1" below). The reference traction force characteristic Lout1 is the required traction force characteristic when the accelerator operation amount Aac is the maximum value (i.e., 100%). The reference traction force characteristic Lout1 is defined in accordance with a gear stage selected by the gear-shift operating member 53$a$. The transmission requirement setting unit 84 determines the current required traction force characteristic Lout2 by multiplying a traction force ratio FWR and a vehicle speed ratio VR with the reference traction force characteristic Lout1.

The storage unit 56 stores the traction force ratio information D2 and the vehicle speed ratio information D3. The traction force ratio information D2 defines the traction force ratio FWR in relation to the accelerator operation amount Aac. The vehicle speed ratio information D3 defines the vehicle speed ratio VR in relation to the accelerator operation amount Aac. The transmission requirement setting unit 84 sets the traction force ratio FWR and the vehicle speed ratio VR in accordance with the accelerator operation amount Aac. Multiplying the reference traction force characteristic Lout1 by the traction force ratio FWR which is along the vertical axis representing the required traction force, and the vehicle speed ratio VR which is along the horizontal axis representing the output rotation speed Nout, the transmission requirement setting unit 84 thereby sets a current required traction force characteristic information Lout2 responsive to the accelerator operation amount Aac.

The traction force ratio information D2 defines the traction force ratio FWR so that the traction force ratio FWR increases as the accelerator operation amount Aac increases. The vehicle speed ratio information D3 defines the vehicle speed ratio VR so that the vehicle speed ratio VR increases as the accelerator operation amount Aac increases. However, the traction force ratio FWR is greater than zero when the accelerator operation amount Aac is zero. Similarly, the vehicle speed ratio VR is greater than zero when the accelerator operation amount Aac is zero. Accordingly, the required traction force Tout is a value greater than zero even when the accelerator operating member 51$a$ is not being operated. That is, the power transmission device 24 outputs a traction force even when the accelerator operating member 51$a$ is not being operated. Hereby, a behavior identical to the creep that occurs in a torque converter type gear shifting device can be implemented in the EMT type power transmission device 24.

Note that the required traction force characteristic information D1 defines the required traction force Tout so that the required traction force Tout increases in accordance with the decrease in the output rotation speed Nout. In addition, the transmission requirement setting unit 84 changes the required traction force characteristic to correspond to the gear stage selected by the gear-shift operating member 53$a$ when the above-described gear-shift operating member 53$a$ is operated. For example, when the gear-shift operating member 53a downshifts, the required traction force characteristic information changes from Lout2 to Lout2' as illustrated in FIG. 9. Hereby, the upper limit value of the output rotation speed Nout decreases. Namely, the upper limit value of the vehicle speed decreases.

The required traction force characteristic information D1 also defines the required traction force Tout so that the required traction force Tout is a negative value in relation to a predetermined output rotation speed Nout or greater. Therefore, when the output rotation speed Nout is greater than the upper limit value of an output rotation speed in the speed range selected, the power transmission device 24 the required traction force Tout to a negative value. Braking is initiated when the required traction force Tout is a negative value. A behavior identical to the engine brake that occurs in a torque converter type gear shifting device can be implemented in the EMT type power transmission device 24.

The energy management requirement setting unit 85 illustrated in FIG. 8 determines the energy management required power Hem on the basis of the amount of electrical power remaining in the capacitor 64. The energy management required power Hem is the power that the power transmission device 24 needs to charge the capacitor 64. For instance, the energy management requirement setting unit 85 may determine the current capacitor charge amount from the voltage Vca of the capacitor 64. The smaller the current capacitor charge amount, the larger the energy management requirement setting unit 85 sets the energy management required power Hem.

The work implement requirement setting unit 86 determines the work implement required power Hpto on the basis of the work implement pump pressure Pwp and an operation amount Awo of the work implement operating member 52a (termed "work implement operation amount Awo" below). In the exemplary embodiments, the work implement required power Hpto is the power distributed to the work implement pump 23. However, the work implement required power Hpto may include the power distributed to the steering pump 30 and/or to the transmission pump 29.

More specifically, the work implement requirement setting unit 86 determines a required flow rate Qdm in the work implement pump 23 from the work implement operation amount Awo on the basis of required flow rate information D4. The required flow rate information D4 stored in the storage unit 56 defines the relationship between the required flow rate Qdm and the work implement operation amount Awo. The required flow rate information D4 defines the relationship between the required flow rate Qdm and the work implement operation amount Awo so that the required flow rate Qdm increases as much as the work implement operation amount Awo increases. The work implement requirement setting unit 86 determines the work implement required power Hpto from the required flow rate Qdm and the work implement pump pressure Pwp.

The work implement requirement setting unit 86 also determines the work implement required engine rotation speed Nedm from the flow rate Qdm and the discharge displacement of the hydraulic pump. More specifically, the work implement requirement setting unit 86 determines the work implement required engine rotation speed Nedm by dividing the required flow rate Qdm by the maximum discharge displacement of the hydraulic pump.

The controller 27 includes a target output-shaft torque setting unit 82, a target input-shaft torque setting unit 81, and a commanded torque setting unit 83. The motor control unit 55 includes the target output-shaft torque setting unit 82, the target input-shaft torque setting unit 81, and the commanded torque setting unit 83. The target output-shaft torque setting unit 82, the target input-shaft torque setting unit 81, and the commanded torque setting unit 83 may be used for controlling the motors MG1 and MG2 during only normal travel mode. Therefore, the target output-shaft torque setting unit 82, the target input-shaft torque setting unit 81, and the commanded torque setting unit 83 are collectively referred to as a first motor control unit 55a to identify the functions executed by the motor control unit 55 during high-speed mode.

The target output-shaft torque setting unit 82 determines a target output-shaft torque To_ref. The target output-shaft torque To_ref is a target value for the torque output from the power transmission device 24. The target output-shaft torque setting unit 82 determines the target output-shaft torque To_ref on the basis of the required traction force Tout determined by the transmission requirement setting unit 84. That is, the target output torque To_ref is determined so that the traction force output from the power transmission device 24 conforms to the required traction force characteristic defined in the required traction force characteristic information D1. More specifically, the target output-shaft torque To_ref is determined by multiplying the required traction force Tout by a distribution rate. The distribution rate may be established, for instance, so that a total of the work implement required power Hpto, the transmission required power Htm, and the energy management required power Hem does not exceed the amount of power output from the engine 21.

The target input-shaft torque setting unit 81 determines a target input-shaft torque Te_ref. The target input-shaft torque Te_ref is a target value for the torque entering the power transmission device 24. The target input-shaft torque setting unit 81 determines the target input-shaft torque Te_ref on the basis of the transmission required power Htm and the energy management required power Hem. More specifically, the target input-shaft torque setting unit 81 computes the target input-shaft torque Te_ref by multiplying the transmission required power Htm by the above-described distribution rate, adding the result thereof to the energy management required power Hem, and dividing the resulting summation by the engine rotation speed Ne. Note that the transmission required power Htm may be computed by multiplying the above-described required traction force Tout and the current output rotation speed Nout.

The commanded torque setting unit 83 determines commanded torques Tm1_ref, Tm2_ref for the motors MG1 and MG2 in accordance with torque balance information determined from the target input-shaft torque Te_ref and the target output-shaft torque To_ref. The torque balance information defines a relationship between a target input-shaft torque Te_ref and a target output-shaft torque To_ref which balances the torque within the power transmission device 24. The torque balance information is stored in the storage unit 56.

As above described, the transmission routes for the drive power in the power transmission device 24 differs in the Lo mode and Hi mode. Therefore, the commanded torque setting unit 83 uses different torque balance information to determine the commanded torques Tm1_ref, Tm2_ref in Lo mode and Hi mode respectively. More specifically, the commanded torque setting unit 83 uses first torque balance information represented by the following Formula 1 to determine the commanded torques Tm1_Low, Tm2_Low for the motors MG1 and MG2 during the Lo mode. In the exemplary embodiments, the first torque balance information is a formula that balances the torque in the power transmission device 24.

$$Ts1\_Low = Te\_ref * r\_fr$$

$$Tc1\_Low = Ts1\_Low * (-1) * ((Zr1/Zs1)+1)$$

$$Tr2\_Low = To\_ref * (Zod/Zo)$$

$$Ts2\_Low = Tr2\_Low * (Zs2/Zr2)$$

$$Tcp1\_Low = Tc1\_Low + Ts2\_Low$$

$$Tm1\_Low = Tcp1\_Low * (-1) * (Zp1/Zp1d)$$

$$Tr1\_Low = Ts1\_Low * (Zr1/Zs1)$$

$$Tm2\_Low = Tr1\_Low * (-1) * (Zp2/Zp2d) \quad \text{Formula 1}$$

The commanded torque setting unit 83 also uses second torque balance information represented by the following Formula 2 to determine the commanded torques Tm1_Hi, Tm2_Hi for the motors MG1 and MG2 during the Hi mode. In the exemplary embodiments, the second torque balance information is a formula that balances the torque in the power transmission device 24.

$$Ts1\_Hi = Te\_ref * r\_fr$$

$$Tc1\_Hi = Ts1\_Hi * (-1) * ((Zr1/Zs1)+1)$$

$$Tr2\_Hi = To\_ref * (Zod/Zo)$$

$$Ts2\_Hi = Tr2\_Hi * (Zs2/Zr2)$$

$$Tcp1\_Hi = Tc1\_Hi + Ts2\_Hi$$

$$Tm1\_Hi = Tcp1\_Hi * (-1) * (Zp1/Zp1d)$$

$$Tr1\_Hi = Ts1\_Hi * (Zr1/Zs1)$$

$$Tc2\_Hi = Tr2\_Hi * (-1) * ((Zs2/Zr2)+1)$$

$$Tcp2\_Hi = Tr1\_Hi + Tc2\_Hi$$

$$Tm2\_Hi = Tcp2\_Hi * (-1) * (Zp2/Zp2d) \quad \text{Formula 2}$$

The particulars of the parameters used in the first and second torque balance information is represented in the following Table 1.

TABLE 1

| | |
|---|---|
| Te_ref | Target Input-Shaft Torque |
| To_ref | Target Output-Shaft Torque |
| r_fr | Speed Reduction Ratio in forward-reverse switching mechanism 65 (The forward-reverse switching mechanism 65 reduces the engine rotation speed by 1/r_fr and outputs the result. The speed reduction ratio r_fr is a negative value when the forward-reverse switching mechanism 65 is in forward travel. The speed reduction ratio r_fr is a positive value when the forward-reverse switching mechanism 65 is in reverse travel.) |
| Zs1 | Number of gears in the sun gear S1 in the first planetary gear mechanism 68 |
| Zr1 | Number of gears in the ring gear R1 in the first planetary gear mechanism 68 |
| Zp1 | Number of gears in first carrier gear Gc1 |
| Zp1d | Number of gears in first motor gear Gm1 |
| Zs2 | Number of gears in the sun gear S2 in the second planetary gear mechanism 69 |
| Zr2 | Number of gears in the ring gear R2 in the second planetary gear mechanism 69 |
| Zp2 | Number of gears in the first outer ring gear Gr1 |

TABLE 1-continued

| | |
|---|---|
| Zp2d | Number of gears in second motor gear Gm2 |
| Zo | Number of gears in the second outer ring gear Gr2 |
| Zod | Number of gears in the output gear 71 |

The details regarding the control of the engine 21 by the controller 27 are described next. As above described, the controller 27 sends command signals to the fuel injector 28 to control the engine 21. A method of determining a commanded throttle value sent to the fuel injector 28 is described below. The controller 27 includes an engine requirement setting unit 87 and a required throttle setting unit 89. The engine control unit 50 includes the engine requirement setting unit 87 and the required throttle setting unit 89. The engine requirement setting unit 87 and the required throttle setting unit 89 are used only during normal travel mode to control the engine 21. Therefore, the engine requirement setting unit 87 and the required throttle setting unit 89 are collectively referred to as a first engine control unit 50a to identify the functions executed by the engine control unit 50 during high-speed mode.

The engine requirement setting unit 87 determines an engine required power Hdm on the basis of the work implement required power Hpto, the transmission required power Htm, and the energy management required power Hem. More specifically, the engine requirement setting unit 87 determines the engine required power Hdm by totaling the work implement required power Hpto, the transmission required power Htm, and the energy management required power Hem.

The required throttle setting unit 89 determines a commanded throttle value Th_cm from the engine required power Hdm, the accelerator operation amount Aac, and the engine rotation speed Nedm required by the work implement. The required throttle setting unit 89 determines the commanded throttle value Th_cm using an engine torque line Let and a matching line Lma which are stored in the storage unit 56. The engine torque line Let defines the relationship between the output torque of the engine 21 and the engine rotation speed Ne. The matching line Lma is used to determine a first required throttle value from the engine required power Hdm.

Figure 10:
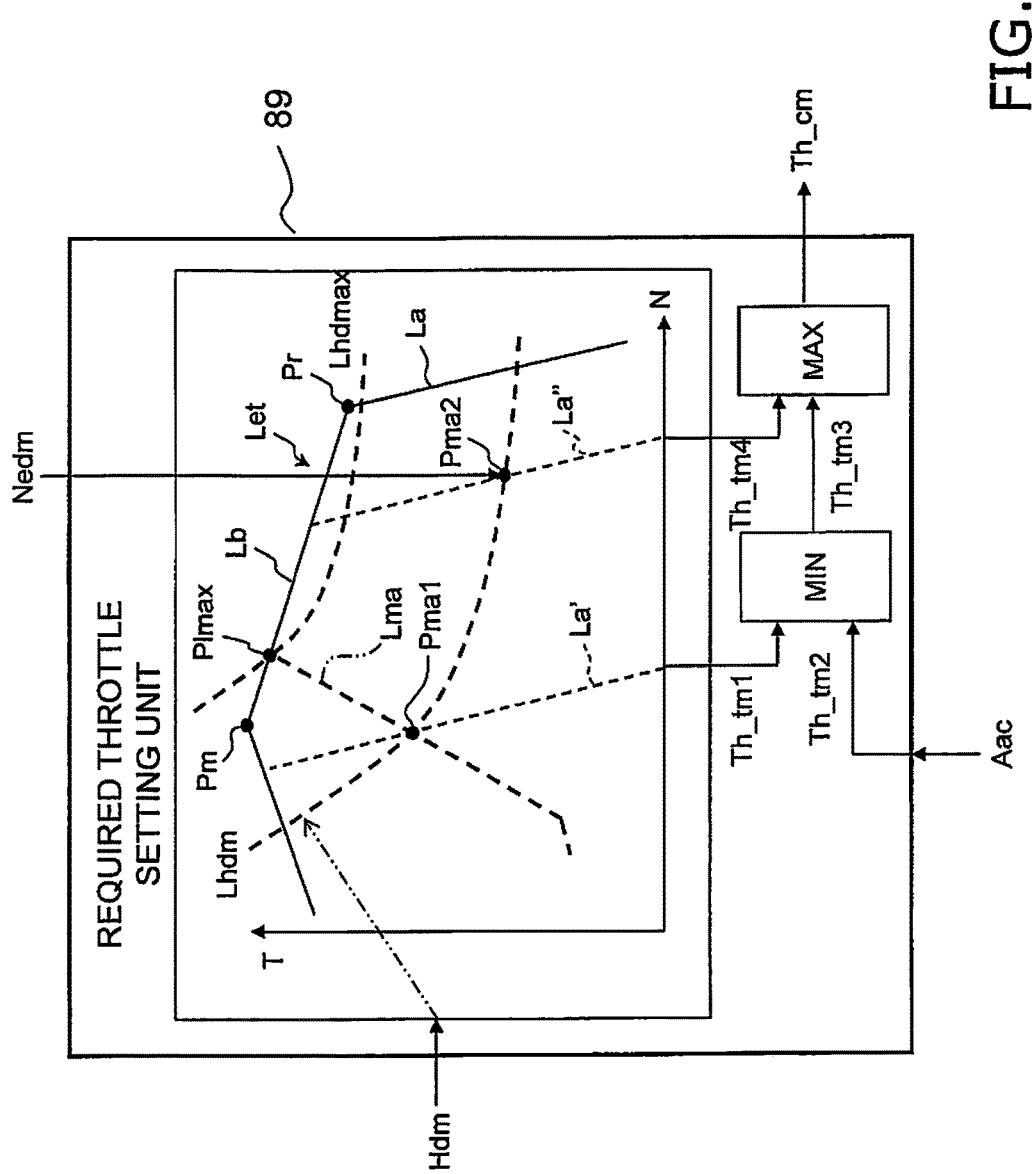
FIG. 10 is a control block diagram illustrating a process for determining a commanded throttle value for the engine.

As illustrated in FIG. 10, the required throttle setting unit 89 determines a first required throttle value Th_tm1 so that the engine torque line Let and the matching line Lma coincide at a matching point Pma1 at which the output torque of the engine 21 becomes a torque that corresponds to the engine required power Hdm. The required throttle setting unit 89 then selects the smaller of the first required throttle value Th_tm1 and a second required throttle value Th_tm2 that corresponds to the accelerator operation amount Aac as a third required throttle value Th_tm3. Additionally, the required throttle setting unit 89 determines a fourth required throttle value Th_tm4 on the basis of the engine rotation speed Nedm required by the work implement to increase the speed of the work implement when the work implement operation amount Awo exceeds a predetermined threshold serving as the maximum discharge displacement of the work implement pump 23. More specifically, the required throttle setting unit 89 selects the fourth required throttle value Th_tm4 so that the regulation region (La") along the engine torque line Let passes through a point Pma2 at which the engine rotation speed becomes the engine rotation speed Nedm required by the work implement on the line representing the engine required power Hdm. The required throttle setting unit 89 then selects the larger of the third required throttle value Th_tm3 and the fourth required throttle value Th_tm4 as the commanded throttle value Th_cm. Note that the required throttle setting unit 89 selects the third required throttle value Th_tm3 as the commanded throttle value Th_cm when the work implement operation amount Awo does not exceed the predetermined threshold.

Figure 11:
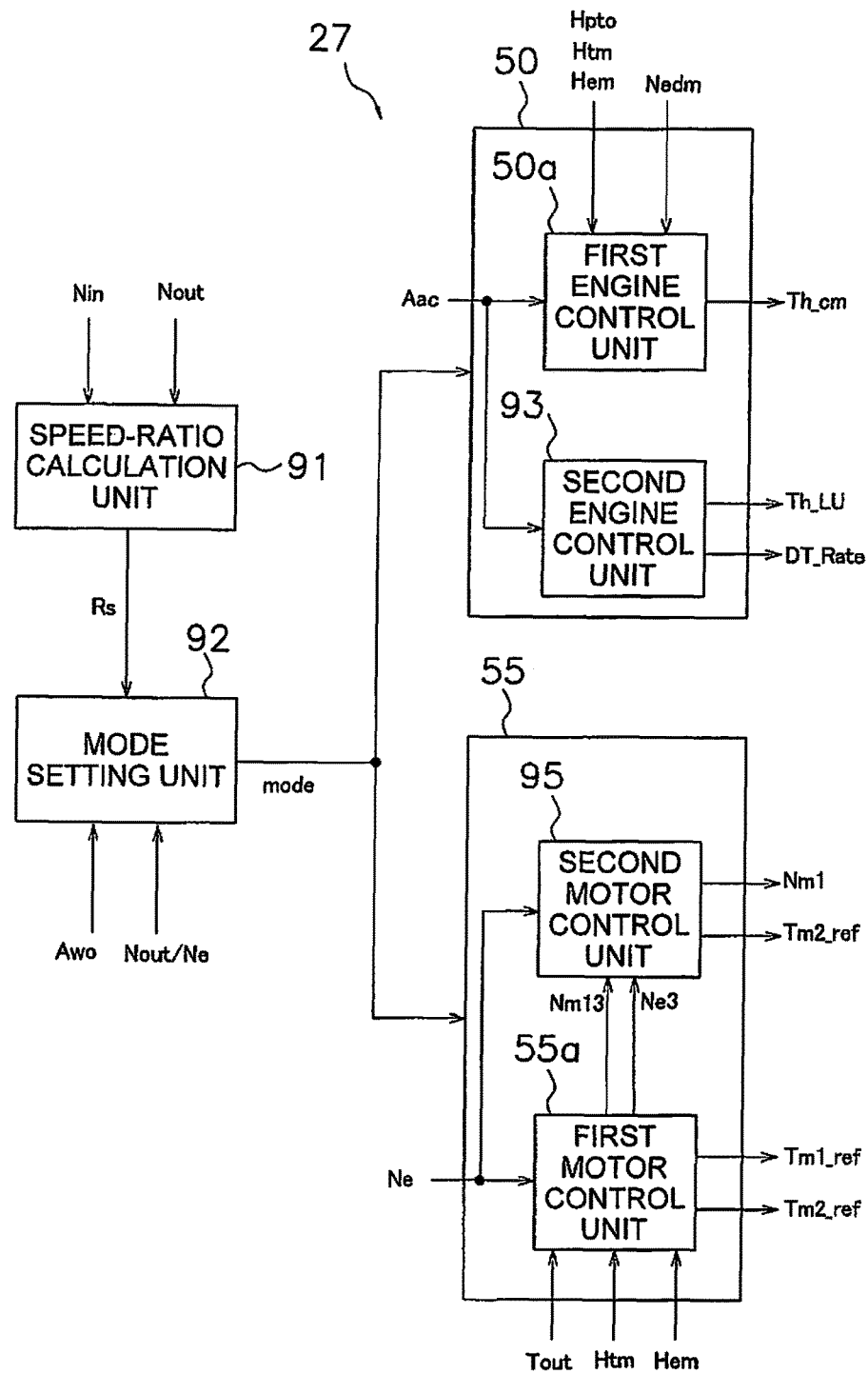
FIG. 11 is a block diagram illustrating a detailed internal configuration of the controller according to the exemplary embodiments.

The control of the power transmission device 24 by the controller 27 during high-speed travel mode is described next. FIG. 11 is a block diagram illustrating a detailed internal configuration of the controller 27 according to the exemplary embodiments. The depiction of the storage unit 56 is omitted from FIG. 11. As illustrated in FIG. 11, the controller 27 includes a speed-ratio calculation unit 91, and a mode setting unit 92. The engine control unit 50 further includes a second engine control unit 93. C The motor control unit 55 further includes a second motor control unit 95.

The speed-ratio calculation unit 91 computes the transmission speed ratio Rs of the power transmission device 24 from the input rotation speed and the output rotation speed of the power transmission device 24. The input rotation speed Nin is detected by the input rotation speed detector 38. The output rotation speed Nout is detected by the output rotation speed detector 37.

The mode setting unit 92 determines which of the normal travel mode or the high-speed travel mode to select on the basis of the transmission speed ratio Rs output from the speed-ratio calculation unit 91, the work implement operation amount Awo, and the engine rotation speed Ne. The mode setting unit 92 may use the output rotation speed Nout instead of the engine rotation speed Ne.

In more concrete terms, the mode setting unit 92 selects the normal travel mode after the work vehicle 1 starts up and until the transmission speed ratio Rs reaches the third threshold Rs_th3. The mode setting unit 92 selects the high-speed travel mode when, the transmission speed ratio Rs reaches the third threshold Rs_th3 and the engine rotation speed Ne exceeds a predetermined rotation speed threshold Ne_th while the work vehicle is traveling in normal travel mode, and the work implement operation amount Awo is greater than or equal to Awo_th2 and less than or equal to Awo_th1, inclusive; note that Awo_th2<0<Awo_th1, where Awo_th2 and Awo_th1 are predetermined operation amounts corresponding to operating the work implement operation lever forward or backward with the neutral position of the lever considered to be zero and the operation amounts preliminarily determined to satisfy the expression. The engine rotation speed threshold Ne_th signifies the low idle rotation speed for the engine 21. When using the output rotation speed Nout instead of the engine rotation speed Ne, the mode setting unit 92 may verify whether the output rotation speed Nout exceeds a predetermined rotation speed threshold Nout_th instead of whether the engine rotation speed Ne exceeds a predetermined rotation speed threshold Ne_th. The following relationship (Formula 3) is established between Nout_th and Ne_th.

$$Nout\_th = Rs\_th3 * |r\_fr| * Ne\_th \quad \text{Formula 3}$$

Here, r_fr indicates the reduction ratio set by the forward-reverse switching mechanism 65 as illustrated in Table 1.

Once the power transmission device 24 switches to the high-speed travel mode, the mode setting unit 92 switches the power transmission device 24 to the normal travel mode when the engine rotation speed Ne is less than or equal to the threshold Ne_th, or the work implement operation amount Awo is greater than Awo_th2 or less than Awo_th1. In all other cases, the mode setting unit 92 maintains the high-speed travel mode. When using the output rotation speed Nout instead of the engine rotation speed Ne, the mode setting unit 92 may verify whether the output rotation speed Nout is less than or equal to a predetermined rotation speed threshold Nout_th instead of whether the engine rotation speed Ne is less than or equal to a predetermined rotation speed threshold Ne_th.

The mode setting unit 92 may perform the above-described determinations at predetermined time intervals; alternatively, the mode setting unit 92 may perform the above-described determinations which can be triggered when the transmission speed ratio Rs reaches the third threshold Rs_th3, the engine rotation speed Ne reaches the threshold Ne_th, the output rotation speed Nout reaches the threshold Nout_th, or whether the work implement operation amount Awo is greater than Awo_th2 or less than Awo_th1. The mode setting unit 92 determines the mode, i.e., normal travel mode or high-speed travel mode and outputs the determined mode to the engine control unit 50 and the motor control unit 55.

The engine control unit 50 includes the first engine control unit 50a and the second engine control unit 93. The motor control unit 55 includes the first motor control unit 55a and the second motor control unit 95. The first engine control unit 50a and the first motor control unit 55a are used during normal travel mode. The second engine control unit 93 and the second motor control unit 95 are used during high-speed travel mode. The engine control unit 50 outputs a signal for controlling the engine 21 from one of the first engine control unit 50a and the second engine control unit 93 on the basis of the mode output from the mode setting unit 92. The motor control unit 55 outputs a signal for controlling the motors MG1 and MG2 from one of the first motor control unit 55a and the second motor control unit 95 on the basis of the mode output from the mode setting unit 92. Given that the first engine control unit 50a and the first motor control unit 55a have already been described, hereafter the second engine control unit 93 and the second motor control unit 95 are discussed in detail.

Figure 12:
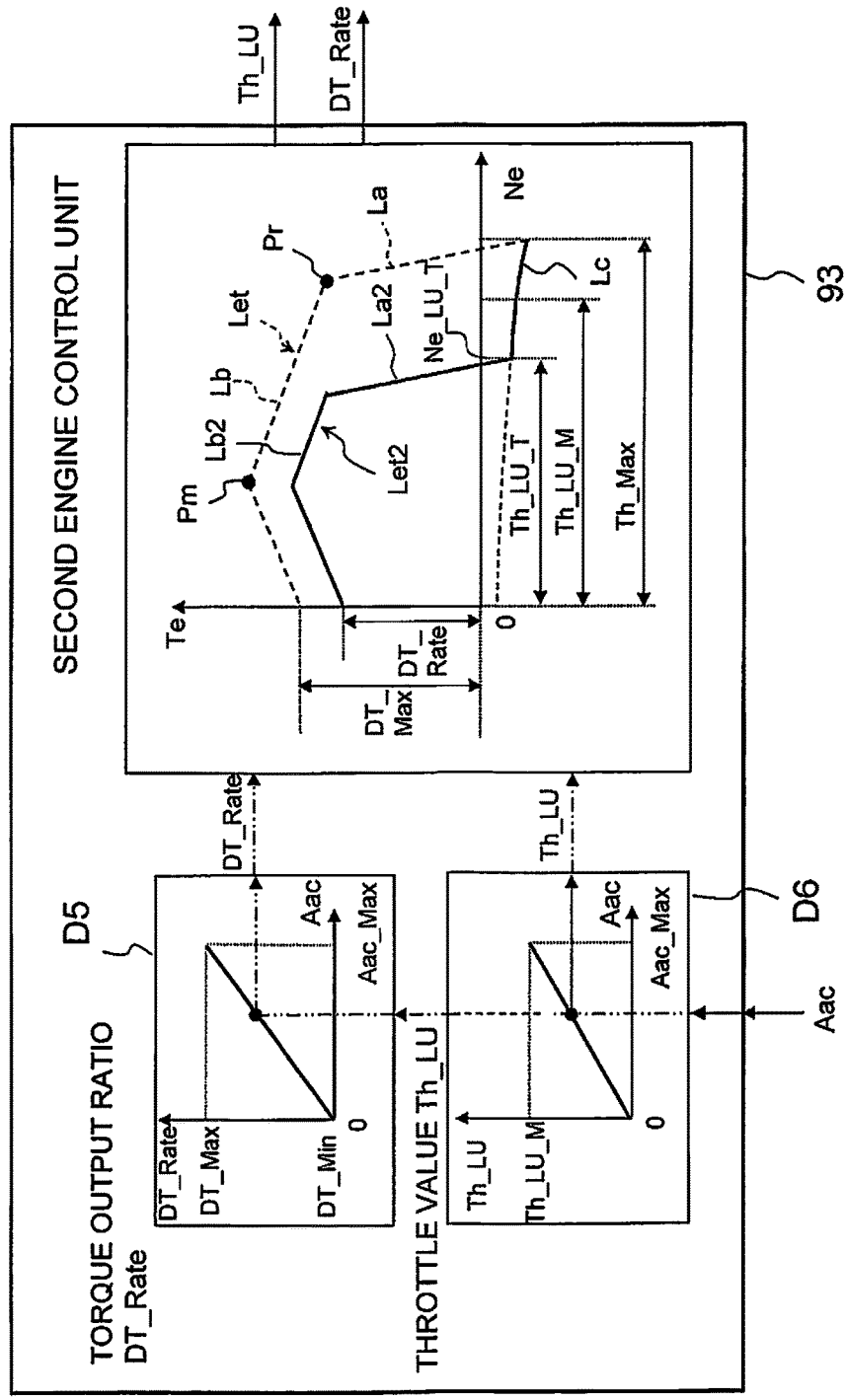
FIG. 12 is a control block diagram illustrating a process carried out by a second engine control unit.

FIG. 12 is a control block diagram illustrating a process carried out by the second engine control unit 93. The second engine control unit 93 determines a torque output ratio DT_Rate from the accelerator operation amount Aac on the basis of torque output ratio information D5. The torque output ratio information D5 is defined so that the torque output ratio DT_Rate increases as the accelerator operation amount Aac increases. The torque output ratio DT_Rate is DT_Min when the accelerator operation amount Aac is zero, and the torque output ratio DT_Rate is DT_Max when the accelerator operation amount Aac is at the maximum value Aac_Max. Preferably, DT_Min is zero, while DT_Max is 100%.

More specifically, the storage unit 56 stores a maximum engine torque line Let. The maximum engine torque line Let defines the relationship between the maximum output torque of the engine 21 and the engine rotation speed Ne. The maximum engine torque line Let includes a regulation region La and a total load region Lb. The regulation region La changes in accordance with a commanded throttle value Th_LU. The total load region Lb includes a regulation point Pr, and a maximum torque point Pm which is located towards the lower engine rotation speed from the regulation point Pr. The torque output ratio DT_Rate is used for setting the total load region Lb during high-speed travel mode. In other words, a total load region Lb2 is the result of multiplying Lb by DT_Rate when the accelerator operation amount is Aac (where Aac<Aac_Max).

The second engine control unit 93 determines a throttle value Th_LU for the high-speed mode from the accelerator operation amount Aac on the basis of throttle information D6. The throttle information D6 defines the throttle value Th_LU so that the throttle value Th_LU increases as the accelerator operation amount Aac increases. The throttle value Th_LU is zero when the accelerator operation amount Aac is zero. Additionally, the throttle value Th_LU is Th_LU_M when the accelerator operation amount Aac is a maximum value Aac_Max. Finally, the throttle value Th_LU is calculated as Th_LU_M×Aac/Aac_Max when the accelerator operation amount Aac is greater than zero and less than the maximum value Aac_Max. Note that Th_LU_M is less than a maximum value Th_Max for the throttle value, which is obtained using a regulation line that passes through the regulation point Pr. Moreover, when the accelerator operation amount Aac equals Aac, a regulation region La2 is established using a regulation line that allows the throttle value to equal Th_LU.

An engine braking region Lc, defined as an area beyond a throttle value of Th_LU_T, represents a negative torque corresponding to engine braking. The fuel injector 28 stops injecting fuel when the engine rotation speed is exceeds an engine rotation speed Ne_LU_T which corresponds to the throttle value Th_LU_T. The engine 21 generates an engine-braking torque. That is, engine 21 externally absorbs the torque corresponding to the internal resistance. An engine torque line Let2 is created from the total load region Lb2, the regulation region La2, and the engine braking region Lc.

The second engine control unit 93 thus increases the torque output from the engine 21 to the extent the operation amount Aac of the accelerator operating member 51a increases, and decreases the torque output from the engine 21 to the extent the operation amount Aac of the accelerator operating member 51a decreases during high-speed travel mode. The second engine control unit 93 outputs a throttle value command signal and an output rate command signal to the fuel injector 28 so that the engine output torque in accordance with the engine rotation speed Ne becomes an engine output torque Te defined by the total load region Lb2, the regulation region La2, and the engine braking region Lc. Additionally, when the mode setting unit 92 switches the power transmission device 24 to normal travel mode, the second engine control unit 93 promptly terminates the current control and the first engine control unit 50a performs the succeeding control.

During high-speed travel mode the second motor control unit 95 controls the rotation speed of the first motor MG1 to ensure the transmission speed ratio is constant. More specifically, from the rotation speed Nm13 of the first motor MG1 when the transmission speed ratio reaches the third threshold Rs_th3 during the normal travel mode, the rotation speed Ne3 of the engine 21, and the current engine rotation speed Ne, the second motor control unit 95 controls the first motor MG1 so that the rotation speed Nm1 thereof satisfies the following Formula 4.

$$Nm1 = Nm13 * Ne/Ne3 \quad \text{Formula 4}$$

Subsequently, the second motor control unit 95 controls the torque of the second motor MG2 to the degree that the second motor MG2 consumes the electrical power generated by the first motor MG1. The voltage in the capacitor 64 can thereby be kept constant during high-speed travel mode. The capacitor 64 may be charged if the electrical power consumed by the second motor MG2 is less than the electrical power generated by the first motor MG1, and discharged if the electrical power consumed by the second motor MG2 is greater than the electrical power generated by the first motor MG1. As is clear from the collinear plot illustrated in FIG. 6C, if the rotation speed Nm1 of the first motor MG1 and the rotation speed Ne of the engine 21 are defined, then the rotation speed Nm2 of the second motor MG2 and the rotation speed Nout of the output shaft 63 are also necessarily defined. Therefore, the second motor control unit 95 does not need to control the speed of the second motor MG2.

With the above control, the second motor control unit 95 controls the first motor MG1 and the second motor MG2 so that the transmission speed ratio remains at the third threshold Rs_th3 when the rotation speed Ne of the engine 21 increases. Consequently, as illustrated in FIGS. 5A and 5B, when the vehicle speed is belongs to a range that is greater than the vehicle speed V3 where the transmission speed ratio reaches the third threshold Rs_th3, the controller 27 can increase the rotation speed of the engine 21 linearly in relation to the vehicle speed (i.e. a linear function) from a rotation speed Ne3 of engine 21 that corresponds to the vehicle speed V3. The second motor control unit 95 may control the torque in the first motor MG1 as above described, and control the rotation speed of the second motor MG2 in the same manner above described. In this case, the rotation speed Nm2 of the second motor MG2 is controlled such that the second motor speed Nm2 is a value proportional to the rotation speed Ne of the engine 21. Additionally, when the mode setting unit 92 switches the power transmission device 24 to normal travel mode, the second motor control unit 95 promptly terminates the current control and the first motor control unit 55a performs the succeeding control. That is, the second motor control unit 95 releases the hold on the transmission speed ratio when the power transmission device 24 is switched to normal travel mode.

Second Exemplary Embodiment

The method for increasing the vehicle speed presented in the first exemplary embodiment is merely one example thereof; it is possible for the second motor control unit 95 to perform control in a different manner and still exhibit the same effects as illustrated with the first embodiment. Therefore, a different method of control that may be performed by the second motor control unit 95 is discussed here as a second exemplary embodiment.

Except for the mode setting unit 92 and the second motor control unit 95, the configuration of the controller 27 in the second exemplary embodiment is identical to that of the first exemplary embodiment. Consequently, the second exemplary embodiment is described focusing on the operations of the mode setting unit 92 and the second motor control unit 95.

In the second exemplary embodiment, the power transmission device 24 switches to high-speed travel mode when the transmission speed ratio Rs is greater than or equal to the second threshold Rs_th2. During high-speed travel mode two additional forms of control are used to control the rotation speed of the first motor MG1 or the rotation speed of the second motor MG2 in accordance with the rotation speed of the second motor MG2.

After the vehicle starts, the mode setting unit 92 selects the normal travel mode until the transmission speed ratio Rs reaches the second threshold Rs_th2. The mode setting unit 92 selects to switch to high-speed travel mode when, the transmission speed ratio Rs reaches the second threshold Rs_th2 and the engine rotation speed Ne exceeds a predetermined rotation speed threshold Ne_th while the work vehicle is traveling in normal travel mode, and the work implement operation amount Awo is greater than or equal to Awo_th2 and less than or equal to Awo_th1. The engine rotation speed threshold Ne_th is the same as described in the first exemplary embodiment.

Once the power transmission device 24 switches to the high-speed travel mode, the mode setting unit 92 switches the power transmission device 24 to the normal travel mode when the engine rotation speed Ne is less than or equal to the threshold Ne_th, or the work implement operation amount Awo is greater than Awo_th2 or less than Awo_th1. In all other cases, the mode setting unit 92 maintains the high-speed travel mode. The mode setting unit 92 may use the output rotation speed Nout instead of the engine rotation speed Ne similar to the first exemplary embodiment presented above. The mode setting unit 92 determines the mode, i.e., normal travel mode or high-speed travel mode and outputs the determined mode to the engine control unit 50 and the motor control unit 55.

During high-speed travel mode the second motor control unit 95 controls the rotation speed of at least one of the first motor MG1 and the second motor MG2 to ensure the transmission speed ratio becomes a given fixed value. At this point the case is described where the second motor control unit 95 controls the rotation speed of the second motor MG2 and controls the torque of the first motor MG1 such that the first motor generates the electrical power to the extent of the electrical power which the second motor MG2 consumes.

Figure 13A:
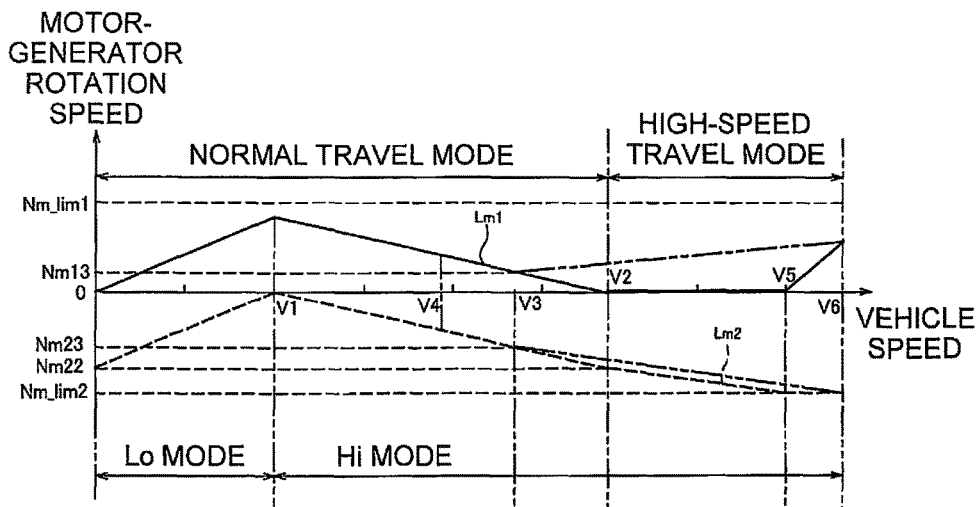
FIGS. 13A-13C illustrate the changes in the rotation speeds of a first motor and a second motor, the changes in the rotation speed of the engine, as well as the changes in the transmission speed ratio in relation to the vehicle speed in a second exemplary embodiment.
Figure 13B:
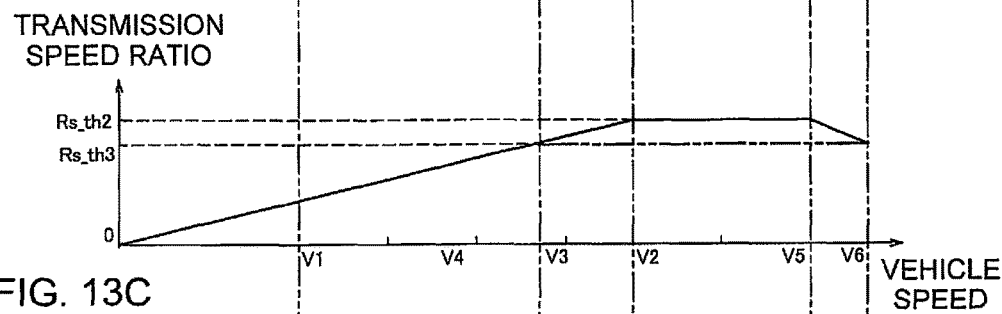
Figure 13C:
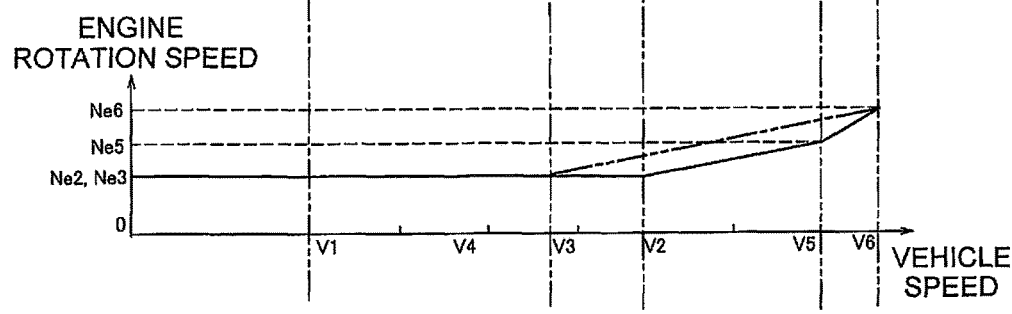

FIG. 13A illustrates the change in the rotation speeds of the first motor MG1 and the second motor MG2 in relation to the vehicle speed in a second embodiment. FIG. 13B illustrates the change in the transmission speed ratio in relation to the vehicle speed of the work vehicle 1 in the second exemplary embodiment. FIG. 13C illustrates the change in the rotation speed of the engine 21 in relation to the vehicle speed of the work vehicle 1 in the second exemplary embodiment. The (solid) line Lm1 represents the rotation speed of the first motor MG1, and the (dotted) line Lm2 represents the rotation speed of the second motor MG2 in FIG. 13A. In FIG. 13A, the rotation direction of the first motor when the work vehicle 1 travels forward is assumed to be the forward direction; a positive rotation speed represents the motors MG1 and MG2 rotating in the forward direction, and a negative rotation speed represents the motors rotating in the reverse direction. The vehicle speeds or the variations in the transmission speed ratio at greater than or equal to the vehicle speed V3 in the first exemplary embodiment are illustrated with dash double-dot lines to facilitate comparison with the first exemplary embodiment.

After the work vehicle exceeds the vehicle speed V2 and until the vehicle speed V5 at which the rotation speed of the second motor MG2 reaches the limit value Nm_lim2, the second motor control unit 95 controls the first motor MG1 and the second motor MG2 so that the transmission speed ratio remains at the second threshold Rs_th2. More specifically, assuming the rotation speed of the second motor MG2, the rotation speed of the engine 21 is Ne2, and the current engine rotation speed is Ne when the transmission speed ratio reaches the second threshold Rs_th2 is Nm22, the second motor control unit 95 controls the second motor MG2 so that the speed Nm2 thereof satisfies the following Formula 5.

$$Nm2 = Nm22 * Ne/Ne2 \qquad \text{Formula 5}$$

When described as a collinear plot, the control of the power transmission device 24 from the vehicle speed V2 until the vehicle speed V5 indicates that the power transmission device 24 is controlled to move from the state illustrated by the dotted line toward the state illustrated by the solid line. Therefore, Nc1 and Ns2 are fixed. Consequently the rotation speed of the input shaft 61 increases by $(Zr1/Zs1)/(1+Zs2/Zr2)$ times the increment to the rotation speed of the output shaft 63. The vehicle speed is proportional to the rotation speed of the output shaft 63. Moreover, as presented in Table 1, the rotation speed of the input shaft 61 is proportional to the engine rotation speed. Accordingly, a ratio of the amount of change in the engine rotation speed to the amount of change in the vehicle speed is constant; the ratio K2 of the amount of change in the engine rotation speed with respect to the amount of change in the vehicle speed can be expressed by the following Formula 6.

$$K2 = K0 * (Zr1/Zs1)/(1+Zs2/Zr2) \qquad \text{Formula 6}$$

Where, K0 is a predetermined coefficient obtained from r_fr (Table 1) and a conversion factor used to calculate the vehicle speed from the rotation speed of the output shaft.

The controller 27 uses the above control to increase the rotation speed of the engine linearly in relation to the vehicle speed (i.e. a linear function) from a speed Ne2 corresponding to the vehicle speed V2 as illustrated in FIGS. 13A-13C.

Next, when increasing the vehicle speed beyond the vehicle speed V5 where the rotation speed of the second motor MG2 is the limit value Nm_lim2, the second motor control unit 95 controls the first motor MG1 and the second motor MG2 so that the transmission speed ratio decreases. More specifically the second motor control unit 95 performs control to ensure that the rotation speed of the second motor MG2 remains fixed at Nm_lim2. When described using the collinear plot, this indicates that other points on the solid line in FIG. 7B change while Nc2_lim, and Nr1_lim are fixed. At this point the rotation speed of the input shaft 61 increases by $(1+Zr1/Zs1)/(Zs2/Zr2)$ times an increment to the rotation speed of the output shaft 63. Therefore the transmission speed ratio decreases as the vehicle speed increases. Furthermore, when the vehicle speed is V6, the rotation speed of the motors MG1 and MG2 and the engine 21, as well as the transmission speed ratio are the same as in the first exemplary embodiment.

Note that as described above the vehicle speed is proportional to the rotation speed of the output shaft 63 and the rotation speed of the input shaft 61 are proportional to the engine rotation speed. Accordingly, a ratio of the amount of change in the vehicle speed to the amount of change in the engine rotation speed is constant; the ratio K5 of the amount of change in the engine rotation speed with respect to the amount of change in the vehicle speed can be expressed by the following Formula 7.

$$K5 = K0 * (1+Zr1/Zs1)/(Zs2/Zr2) \qquad \text{Formula 7)}$$

It can thus be derived from the following Formula 8 that K5 is larger than K2 (i.e., that K2 is less than K5). Accordingly, the slope of the line between the vehicle speeds V5 and V6 is larger than the slope of the line between the vehicle speeds V2 and V5 as illustrated in FIG. 13C.

$$K5-K2 = K0*(1+Zr1/Zs1+Zs2/Zr2)/(Zs2/Zr2)(1+Zs2/Zr2) > 0 \qquad \text{Formula 8}$$

The controller 27 uses the above control to increase the rotation speed of the engine from a speed Ne5 corresponding to the vehicle speed V5 as above described and as illustrated in FIGS. 13A-13C.

A work vehicle 1 according to the exemplary embodiments has the following features.

When the vehicle speed is within a range of vehicle speeds that are greater than the vehicle speed v3 where the transmission speed ratio reaches a third threshold Rs_th3 that is less than the maximum value of the transmission speed ratio (Rs_th2) obtainable by the power transmission device 24, the controller can increase the rotation speed of the engine 21 from the engine rotation speed Ne3 corresponding to the vehicle speed v3. Hereby, the work vehicle 1 can increase the vehicle speed up to a vehicle speed v6 which is higher than the vehicle speed v2 that can be obtained by performing continuously variable shifting. Furthermore, the work vehicle 1 can increase the vehicle speed up to the vehicle speed v6 which is higher than the vehicle speed v5 that can be obtained by increasing the rotation speed of the engine 21 after increasing the transmission speed ratio to a maximum value Rs_th2.

The third threshold Rs_th3 is greater than a speed ratio Rs4. If the third threshold Rs_th3 were less than the transmission speed ratio Rs4, the rotation speed of the first motor MG1 would be the first to reach the limit value Nm_lim1 (refer to FIG. 5A and FIG. 13A), and the work vehicle 1 would be unable to increase the vehicle speed to the above-described vehicle speed v6. Therefore, selecting the third threshold Rs_th3 to be greater than the transmission speed ratio Rs4 is effective in increasing the limiting vehicle speed for the work vehicle 1.

When the vehicle speed is within a range of vehicle speeds that are greater than the vehicle speed v3, the controller 27 increases the rotation speed of the engine 21 linearly in relation to the vehicle speed from the rotation speed Ne3 of the engine 21 corresponding to the vehicle speed v3. More specifically, the motor control unit 55 controls the first motor MG1 and the second motor MG2 so that the transmission speed ratio is kept at the third threshold Rs_th3 when increasing the rotation speed of the engine 21. The motor control unit 55 further controls the rotation speed of at least one of the first motor MG1 and the second motor MG2 so that the rotation speed thereof is a value proportional to the rotation speed of the engine 21. Hereby, the vehicle speed of the work vehicle 1 can be increased proportionally with the increase in the rotation speed of the engine 21 while the transmission speed ratio is kept at the third threshold Rs_th3.

When the vehicle speed belongs to a range of vehicle speeds larger than the vehicle speed v3, the engine control unit 50 increases the torque output from the engine 21 to the extent the operation amount Aac of the accelerator operating member 51a increases, and decreases the torque output from the engine 21 to the extent the operation amount Aac of the accelerator operating member 51a decreases. Hereby, acceleration and deceleration of the work vehicle 1 according to an operator's intent can be achieved.

The motor control unit 55 releases the hold on the transmission speed ratio if the speed of the engine 21 reaches or falls below a predetermined rotation speed threshold Ne_th while the transmission speed ratio is being kept at the third threshold Rs_th3. The rotation speed Ne_th signifies the low idle engine rotation speed for the engine 21. Therefore, the probability is high that the engine will stall if the rotation speed of the engine 21 becomes any lower. Consequently, releasing the hold on the aforementioned transmission speed ratio prevents the engine 21 from stalling.

The motor control unit 55 releases the hold on the transmission speed ratio when the work implement operating member 52a is operated. As described in relation to FIG. 10, when the work implement 3 is operated, it is not possible to obtain sufficient speed for the work implement if the rotation speed of the engine 21 is not increased when the required flow rate Qdm is larger than the maximum discharge displacement of the work implement pump 23. Accordingly, when the work implement operating member 52a is operated, releasing the hold on the transmission speed ratio allows control of the rotation of the engine 21 at a speed that supports the speed of the work implement (i.e., control of the normal travel mode).

In the second exemplary embodiment the motor control unit 55 controls the first motor MG1 and the second motor MG2 so that the transmission speed ratio is kept at a maximum value Rs_th2 when the vehicle speed belongs to a range of speeds greater than the vehicle speed v2 where the transmission speed ratio reaches the maximum value Rs_th2 thereof, and less than the vehicle speed v5 where the rotation speed of the second motor MG2 reaches a predetermined limit value Nm_lim2. The motor control unit 55 controls the first motor MG1 and the second motor MG2 so that the transmission speed ratio decreases when the vehicle speed is within a range of vehicle speeds that are greater than the vehicle speed v5. The controller 27 increases the rotation speed of the engine 21 linearly from the engine rotation speed Ne2 corresponding to the vehicle speed v2 when the vehicle speed is within a range of vehicle speeds that are greater than the vehicle speed v2 and less than the vehicle speed v5, and increases the rotation speed of the engine 21 from the engine rotation speed Ne5 corresponding to the vehicle speed v5 when the vehicle speed is within a range of vehicle speeds that are greater than the vehicle speed v5. In more concrete terms, the ratio K2 of the increment in the rotation speed of the engine 21 with respect to the increment in the vehicle speed when the vehicle speed is within a range of vehicle speeds that are greater than the vehicle speed V2 and less than the vehicle speed V5 is less than the ratio K5 of the increment in the rotation speed of the engine with respect to the increment in the vehicle speed when the vehicle speed is within a range of vehicle speeds that are greater than the vehicle speed V5.

Hereby, the work vehicle 1 can increase the vehicle speed up to a vehicle speed (greater than or equal to v6) which is higher than the vehicle speed v2 that can be obtained by performing continuously variable shifting. Given that the work vehicle 1 travels at a maximum transmission speed ratio Rs_th2 between the vehicle speeds v2 to v5, the engine rotation speed is reduced compared to the engine rotation speed in the first embodiment. Therefore, the fuel economy of the work vehicle improves compared to the work vehicle of the first embodiment, and it is possible to suppress wear and deterioration of the output shaft of the engine 21. Furthermore, the work vehicle 1 can increase the vehicle speed up to a vehicle speed (i.e., v6 or greater) which is higher than the vehicle speed v5 that can be obtained by increasing the rotation speed of the engine 21 after increasing the transmission speed ratio to a maximum value Rs_th2. The limit vehicle speed for the work vehicle 1 may hereby be further increased.

The first motor MG1 and the second motor MG2 are preferably electric motors. Compared to hydraulic motors, an electric motor is characterized by less torque its ability to be used at higher revolutions. Consequently an electric motor is often combined and used with a reducer. When the reducer is used, the deceleration causes an increase in the torque, however the rotation speed increases. Therefore, the rotation speed of the first motor MG1, or the second motor MG2 tends to reach the limit value, and the operations of the controller 27 in the exemplary embodiments are particularly effective.

The present invention is not limited to the exemplary embodiments such as above described, and may be modified or revised in various ways without deviating from the scope of the invention.

The exemplary embodiments of the present invention are not limited to the above described wheel loader, and may be adopted in another type of work vehicle such as a bulldozer, a tractor, a forklift a motor grader, or the like.

The exemplary embodiments of the present invention are not limited to an EMT and may be adopted in another type of shifting device such as an HMT. In this case, the first motor MG1 would function as a hydraulic motor and a hydraulic pump. The second motor MG2 would also functions as a hydraulic motor and a hydraulic pump. The first motor MG1 and the second motor MG2 may be variable displacement pump-motors where the controller 27 controls the swashplate or the tilt angle of the tilt axis to control the discharge displacement thereof. Further the discharge displacement of the first motor MG1 and the second motor MG2 may be controlled so that a commanded torque Tm1_ref, Tm2_ref, computed identically as in the above-mentioned embodiment, is output. Note that in an HMT, when controlling the transmission speed ratio, the ratio of the discharge displacements of the first motor MG1 and the second motor MG2 may be set equal to the inverse ratio of the rotation speeds of the first motor MG1 and the second motor MG2. Additionally, the displacement of at least one of the pump-motors may be fixed when controlling the rotation speed of the hydraulic motor.

The configuration of the power transmission device 24 is not limited to the configuration in the above-mentioned exemplary embodiments. For instance, the linkages between and arrangements of each of the elements in the two planetary gear mechanisms 68 and 69 are not limited to the linkages and arrangements in the above-mentioned exemplary embodiments. Additionally, the power transmission device 24 is not limited to being equipped with two planetary gear mechanisms. The power transmission device 24 may have only one planetary gear mechanism. Alternatively, the power transmission device 24 may have three or more planetary gear mechanisms. The power transmission device 24 may have other drive power transmission routes besides Hi mode and Lo mode. However, even if the power transmission device 24 possesses drive transmission routes along three or more modes, the second engine control unit 93 and the second motor control unit 95 carry out control during the modes usable in the range where the transmission speed ratios are the highest within the range of transmission speed ratios usable in the modes for the power transmission device 24. In other words, the work vehicle travels in the high-speed travel mode presented in the above-mentioned embodiment during the modes usable in the range where the transmission speed ratios are the highest within the range of transmission speed ratios usable in the modes for the power transmission device 24.

The control of the power transmission device 24 is not limited to the control in the above-mentioned exemplary embodiments. In other words, in the above exemplary embodiments, a target input-shaft torque Te_ref and a target output-shaft torque To_ref are determined to obtain a prescribed relationship between the vehicle speed and the traction force when the traction force continuously changes in accordance with the vehicle speed. However, the target input-shaft torque Te_ref and the target output-shaft torque To_ref may be established in any desired manner.

The torque balance information is not limited to an expression that balances the torque in the power transmission device as in the above exemplary embodiments. For instance, the torque balance information may be in another format, such as a table or a map. The torque balance information is not limited to merely two pieces of torque balance information, i.e., the first torque balance information and the second torque balance information. When there are three or more modes in the drive power transmission route in the power transmission device 24, three or more pieces of torque balance information may be used to match the number of selectable modes. Alternatively, when there is only one mode in the drive power transmission route in the power transmission device 24, just one piece of torque balance information may be used.

The present invention is useful in a hybrid work vehicle that increases the limiting vehicle speed, and useful as a method of controlling a work vehicle.

The invention claimed is:

1. A work vehicle comprising:
an engine;
a hydraulic pump driven by the engine;
a work implement driven by hydraulic fluid discharged from the hydraulic pump;
a travel apparatus driven by the engine;
a power transmission device that transmits drive power from the engine to the travel apparatus;
a controller that controls the power transmission device;
the power transmission device including
an input shaft,
an output shaft,
a gear mechanism including a planetary gear mechanism, the gear mechanism transmitting rotation of the input shaft to the output shaft,
a first motor and a second motor each connected to rotational elements in the planetary gear mechanism, and
a mode switching mechanism that switches a drive power transmission route in the power transmission device to one mode of at least two modes,
the gear mechanism being configured such that varying rotation speeds of the motors varies a transmission speed ratio in the power transmission device, the transmission speed ratio being a ratio of a rotation speed of the output shaft to a rotation speed of the input shaft,
the at least two modes including a first mode and a second mode, the second mode being used in a range of the transmission speed ratio that is higher than a range of the transmission speed ratio in which the first mode is used,
the controller being configured such that when a vehicle speed of the work vehicle increases beyond a first vehicle speed where the transmission speed ratio reaches a predetermined first value that is less than a maximum value of the transmission speed ratio obtainable by the power transmission device, the controller increases a rotation speed of the engine from a first engine rotation speed corresponding to the first vehicle speed, and
the first value of the transmission speed ratio being greater than a second value of the transmission speed ratio, the second value being a value of the transmission speed ratio at which the rotation speed of the first motor and the rotation speed of the second motor are equal when the transmission route is in the second mode.

2. The work vehicle according to claim 1, wherein the range of transmission speed ratios used during the second mode is the range with the highest of the transmission speed ratios among the ranges that can be used during the at least two modes.

3. The work vehicle according to claim 2, wherein when the transmission speed ratio is at a predetermined mode switching threshold, a rotation speed ratio of the first motor to the input shaft is the same in the first mode of the drive power transmission route as in the second mode of the drive power transmission route, and a rotation speed ratio of the second motor to the input shaft is the same in the first mode of the drive power transmission route as in the second mode of the drive power transmission route; and
the second value of the transmission speed ratio is greater than the mode switching threshold and less than the maximum value of the transmission speed ratio.

4. The work vehicle according to claim 1, wherein the controller increases the rotation speed of the engine linearly in relation to the vehicle speed when the controller increases the engine speed from the first engine rotation speed in response to the vehicle speed being in a range of the vehicle speeds greater than the first vehicle speed.

5. The work vehicle according to claim 1, wherein the controller further includes a motor control unit that controls the first motor and the second motor to hold the transmission speed ratio at the first value while the rotation speed of the engine is increasing.

6. The work vehicle according to claim 5, wherein the motor control unit controls the rotation speed of at least one of the first motor and the second motor to be proportional to the rotation speed of the engine.

7. The work vehicle according to claim 5, further comprising
an accelerator operating member configured to be operated by an operator
the controller including an engine control unit configured to increase a torque output from the engine as an operation amount of the accelerator operating member increases, and decrease the torque output from the engine as the operation amount of the accelerator operating member decreases when the vehicle speed increases beyond the first vehicle speed.

8. The work vehicle according to claim 5, wherein the motor control unit releases the hold on the transmission speed ratio when the rotation speed of the engine reaches or falls below a predetermined second engine rotation speed while the transmission speed ratio is being held at the first value.

9. The work vehicle according to claim 5, further comprising a work implement operating member configured to be used by an operator to operate the work implement;
the motor control unit releasing the hold on the transmission speed ratio when the work implement operating member is operated.

10. The work vehicle according to claim 1, wherein the first motor and the second motor are electric motors.

11. A method of controlling a work vehicle provided with a power transmission device,
the power transmission device including
an input shaft,
an output shaft,
a gear mechanism including a planetary gear mechanism that transmits a rotation of the input shaft to the output shaft,
a first motor and a second motor each connected to rotational elements in the planetary gear mechanism, and
a mode switching mechanism that switches a drive power transmission route in the power transmission device to one mode of at least two modes,
the gear mechanism being configured such that varying the rotation speed of the motors varies the transmission speed ratio, the transmission speed ratio being a ratio of a rotation speed of the output shaft to a rotation speed of the input shaft,
the at least two modes including a first mode and a second mode, the second mode used in a range of the transmission speed ratio that is higher than a range of the transmission speed ratio in which the first mode is used, and
the method comprising:
increasing a rotation speed of the engine from a first engine rotation speed corresponding to a first vehicle speed when a vehicle speed of the work vehicle is in a range greater than the first vehicle speed, the first vehicle speed being a vehicle speed where the transmission speed ratio is a predetermined first value that is less than a maximum value of the transmission speed ratio obtainable by the power transmission device,
the first value being greater than a second value of the transmission speed ratio, the second value being a value of the transmission speed ratio at which the rotation speed of the first motor and the rotation speed of the second motor are equal when the transmission route is in the second mode.

* * * * *